(12) United States Patent
Yamaguchi et al.

(10) Patent No.: US 11,644,663 B2
(45) Date of Patent: May 9, 2023

(54) LIGHT DEFLECTOR AND ITS MANUFACTURING METHOD, IMAGE PROJECTOR, OBJECT RECOGNITION DEVICE, LASER HEADLAMP DEVICE, OPTICAL WRITING DEVICE, AND MOBILE OBJECT

(71) Applicants: Toshiya Yamaguchi, Kanagawa (JP); Toshiyuki Ikeoh, Miyagi (JP)

(72) Inventors: Toshiya Yamaguchi, Kanagawa (JP); Toshiyuki Ikeoh, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 947 days.

(21) Appl. No.: 16/413,845

(22) Filed: May 16, 2019

(65) Prior Publication Data
US 2019/0369387 A1 Dec. 5, 2019

(30) Foreign Application Priority Data
May 31, 2018 (JP) .............................. JP2018-105152

(51) Int. Cl.
*G02B 26/08* (2006.01)
*F21S 41/16* (2018.01)
(Continued)

(52) U.S. Cl.
CPC ...... *G02B 26/0833* (2013.01); *B29D 11/0074* (2013.01); *F21S 41/16* (2018.01); *F21S 41/176* (2018.01); *F21S 41/30* (2018.01); *F21S 41/675* (2018.01); *G01S 7/4817* (2013.01); *G01S 17/04* (2020.01); *G02B 26/10* (2013.01); *G02B 27/0101* (2013.01); *G03G 15/04036* (2013.01);
(Continued)

(58) Field of Classification Search
None
See application file for complete search history.

(56) References Cited

U.S. PATENT DOCUMENTS

2006/0176539 A1 8/2006 Choi et al.
2007/0166864 A1 7/2007 Lee et al.
(Continued)

FOREIGN PATENT DOCUMENTS

JP H10-253912 9/1998
JP 2006-221171 8/2006
(Continued)

*Primary Examiner* — Ashok Patel
(74) *Attorney, Agent, or Firm* — IPUSA, PLLC

(57) ABSTRACT

A light deflector, a method of manufacturing the light deflector, and an image projector. The light deflector and the method includes forming a first wafer provided with a plurality of movable mirror units, bonding the first wafer to be sandwiched between a second wafer on which a plurality of base units are formed and a third wafer on which a plurality of spacers are formed, bonding a fourth wafer on which a plurality of transparent members are formed on the third wafer, bonding a plurality of polyhedron light-beam adjusters on the fourth wafer such that one of the plurality of polyhedron light-beam adjusters and the movable mirror unit become a pair, and cutting a wafer layered product of the first to fourth wafers for each area in which the light deflector is formed. The image projector includes the light deflector, and an image is projected by optical scanning.

20 Claims, 35 Drawing Sheets

(51) Int. Cl.
 *F21S 41/176* (2018.01)
 *F21S 41/30* (2018.01)
 *F21S 41/675* (2018.01)
 *G02B 26/10* (2006.01)
 *B29D 11/00* (2006.01)
 *G03G 15/04* (2006.01)
 *G02B 27/01* (2006.01)
 *B29K 709/08* (2006.01)
 *G01S 7/481* (2006.01)
 *G01S 17/04* (2020.01)
 *B60K 35/00* (2006.01)

(52) U.S. Cl.
 CPC .......... *B29K 2709/08* (2013.01); *B60K 35/00* (2013.01); *B60K 2370/1529* (2019.05)

(56) References Cited

U.S. PATENT DOCUMENTS

2014/0211302 A1 7/2014 Hatashita et al.
2018/0290881 A1 10/2018 Yamada et al.

FOREIGN PATENT DOCUMENTS

| JP | 2007-034309 | | 2/2007 |
|----|----|----|----|
| JP | 2007-188075 | | 7/2007 |
| JP | 2011-59282 | | 3/2011 |
| JP | 2012-137679 | | 7/2012 |
| JP | 2014-145868 | | 8/2014 |
| JP | 2015-148654 | | 8/2015 |
| JP | 2017-68205 | | 4/2017 |
| JP | 2017-219852 | | 12/2017 |
| JP | 2019-125912 | | 7/2019 |
| WO | 2007077932 | * | 7/2007 |

* cited by examiner

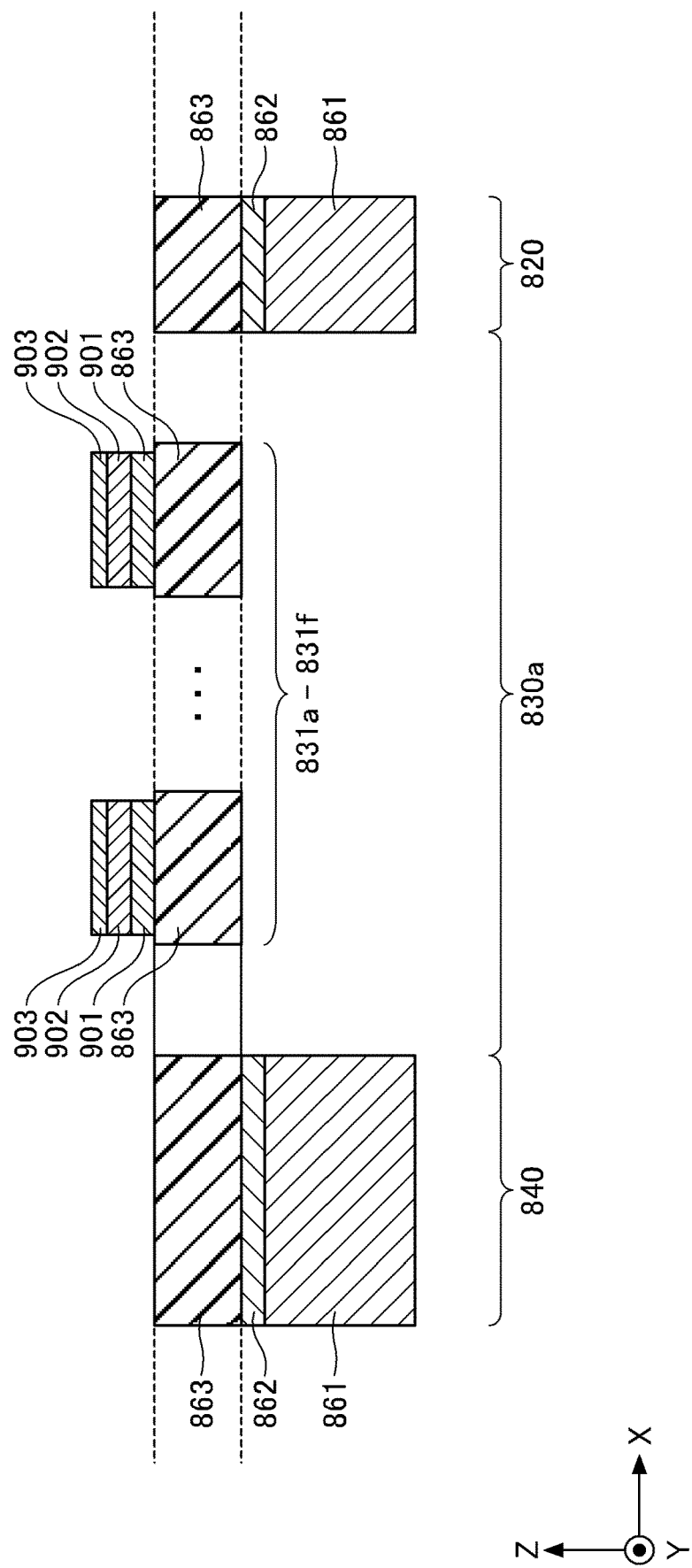

LIGHT DEFLECTOR AND ITS MANUFACTURING METHOD, IMAGE PROJECTOR, OBJECT RECOGNITION DEVICE, LASER HEADLAMP DEVICE, OPTICAL WRITING DEVICE, AND MOBILE OBJECT

CROSS-REFERENCE TO RELATED APPLICATION

This patent application is based on and claims priority pursuant to 35 U.S.C. § 119(a) to Japanese Patent Application No. 2018-105152, filed on May 31, 2018, in the Japan Patent Office, the entire disclosure of which is hereby incorporated by reference herein.

BACKGROUND

Technical Field

Embodiments of the present disclosure relate to a light deflector and its manufacturing method, an image projector, an object recognition device, a laser headlamp device, an optical writing device, and a mobile object.

Background Art

Light deflectors that are provided with a movable mirror unit that reflects incident light to project the reflected light onto an object are known in the art. For example, such light deflectors may be used for a projection optical system such as a heads-up display (HUD) and a pico-projector, a display, and a laser range sensor.

Such light deflectors need to achieve high reliability for changes in the external environment. In particular, in order to prevent a movable mirror unit that is driven when optical scanning is performed from being affected by dust particles or humidity, the movable mirror unit is packaged by covering a light-incident side of a housing in which the movable mirror unit is accommodated with a semitransparent covering member. Accordingly, hermeticity is achieved.

SUMMARY

Embodiments of the present disclosure described herein provide a light deflector, a method of manufacturing the light deflector, and an image projector. The light deflector and the method includes forming a first wafer provided with a plurality of movable mirror units, bonding the first wafer to be sandwiched between a second wafer on which a plurality of base units are formed and a third wafer on which a plurality of spacers are formed, bonding a fourth wafer on which a plurality of transparent members are formed on the third wafer, bonding a plurality of polyhedron light-beam adjusters on the fourth wafer such that one of the plurality of polyhedron light-beam adjusters and the movable mirror unit become a pair, and cutting a wafer layered product of the first to fourth wafers for each area in which the light deflector is formed. The image projector includes the light deflector, and an image is projected by optical scanning performed by the light deflector.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 31 is a Q-Q' sectional view of FIG. 29.

Figure 1:
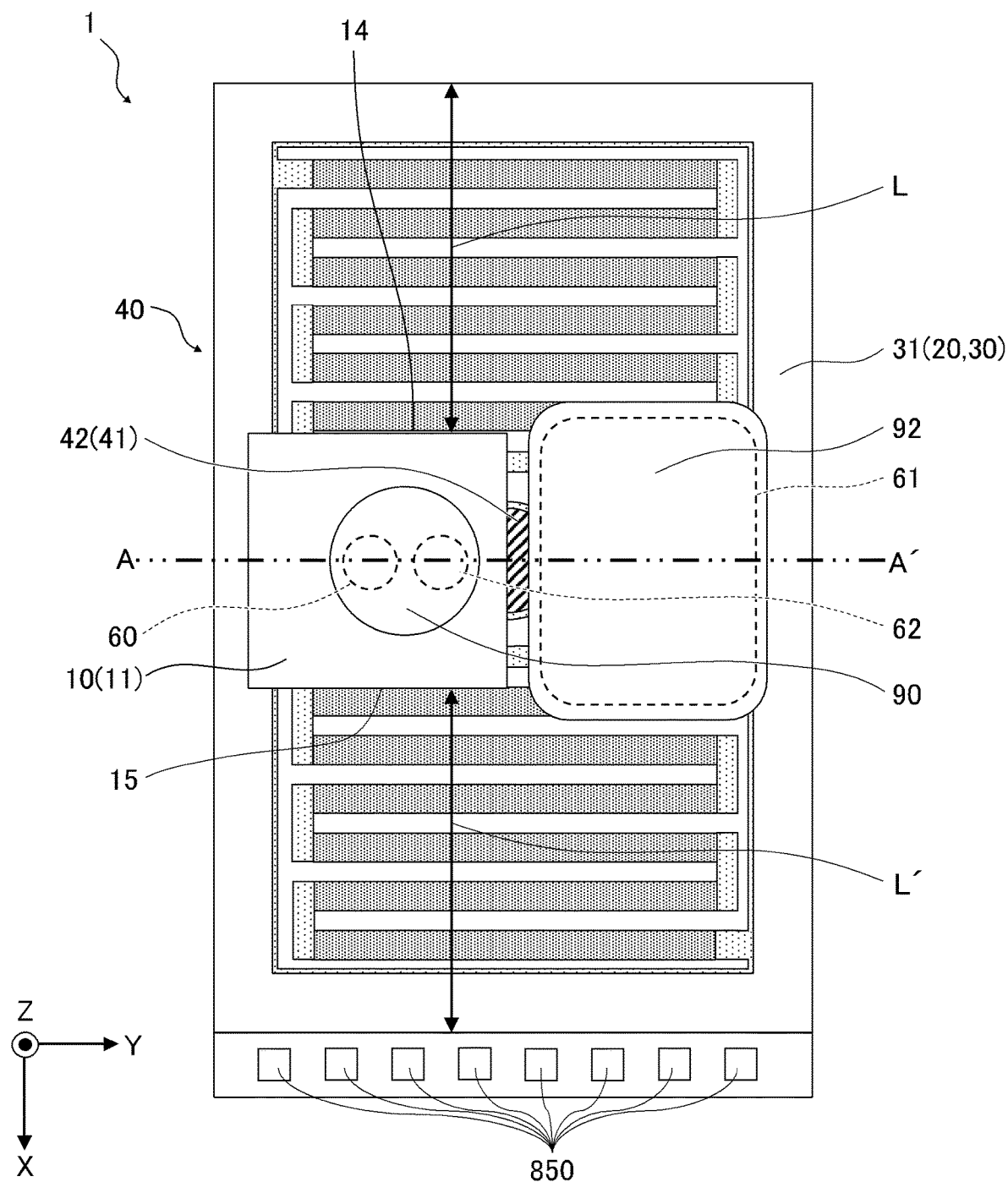
FIG. 1 is a plan view of a configuration of a light deflector according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

First Embodiment

A first embodiments of the present disclosure is described below with reference to the accompanying drawings.

FIG. 1 is a plan view of a configuration of a light deflector 1 according to the first embodiment.

Figure 2:
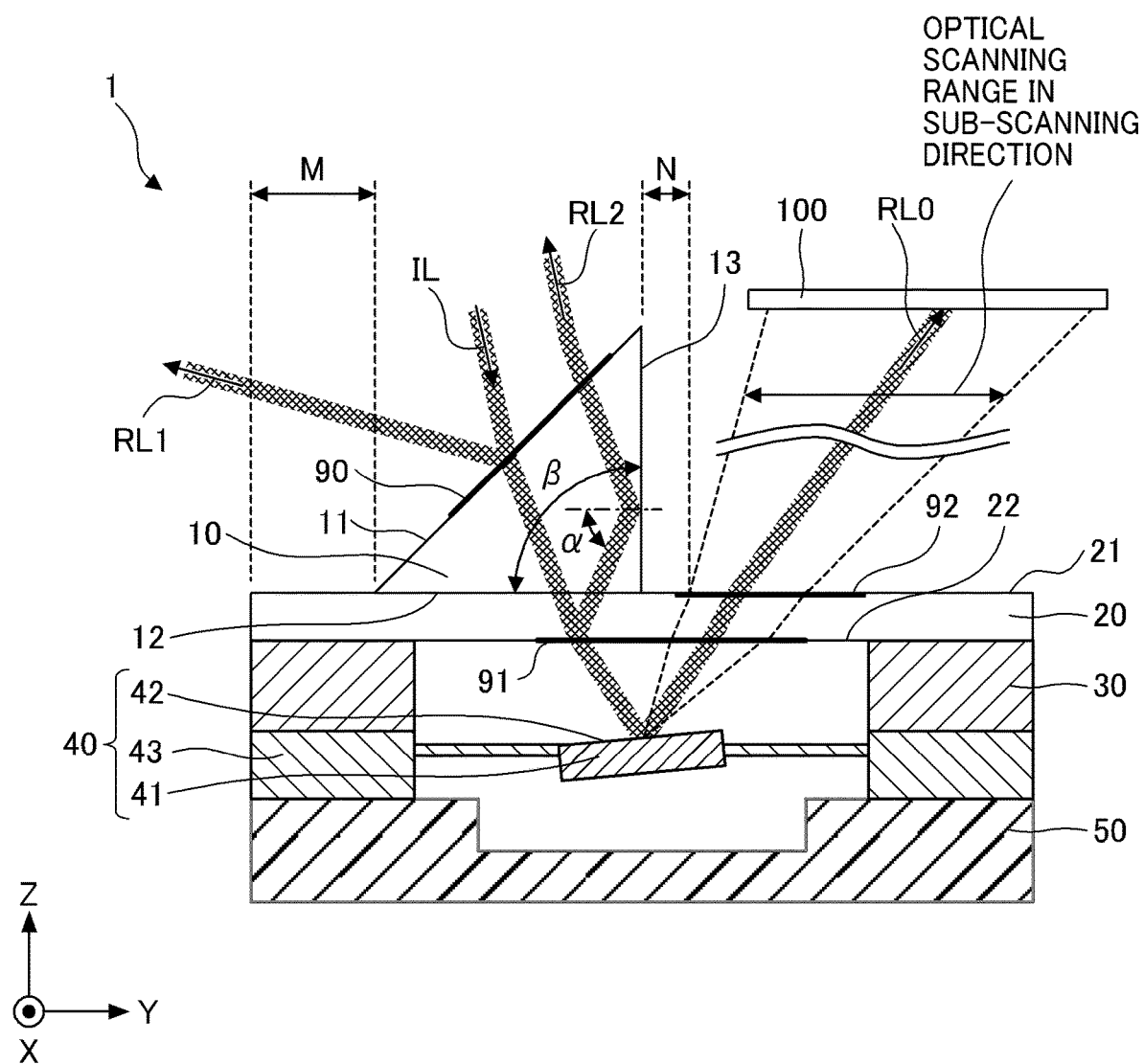
FIG. 2 is a A-A' sectional view of FIG. 1.

FIG. 2 is a A-A' sectional view of FIG. 1.

In FIG. 1, the X-axis direction indicates the main scanning direction of the laser beams, and the Y-axis direction indicates the sub-scanning direction of the laser beams. In FIG. 1, incident light IL (see FIG. 2), which is a laser beam, enters from the −Y-direction (the left side of FIG. 1).

As illustrated in FIG. 1 and FIG. 2, the light deflector 1 includes a movable-mirror deflection element 40, a base unit 50, a spacer 30, a transparent member 20, and a light-beam adjuster 10. The movable-mirror deflection element 40 includes a movable mirror unit 41 that reflects the incident light IL, and a movable-mirror supporting member 43 that supports the movable mirror unit 41.

In the movable-mirror supporting member 43, a first driving unit that drives the movable mirror unit 41 around the first axis (for example, the Z-axis) and a second driving unit that drives the movable mirror unit 41 and the first driving unit around the second axis parallel to the X-axis are arranged. At an edge of the light deflector 1, a plurality of electrode connecting parts 850 that supply driving voltage to the first driving unit and the second driving unit are disposed. The first driving unit and the second driving unit are described below in detail.

The base unit 50 supports the movable-mirror deflection element 40. The spacer 30 is disposed on the movable-mirror supporting member 43 to secure the movable space for the movable mirror unit 41. The transparent member 20 is supported by the spacer 30. The light-beam adjuster 10 is disposed at a position of the transparent member 20 on which the incident light IL is incident.

The base unit 50 and the spacer 30 together configure a housing, and accommodates the movable mirror unit 41. The transparent member 20 is a planar covering member that closes the opening of the housing. The movable mirror unit 41 is hermetically packaged by the housing and the transparent member 20. The package is filled with inert gas such as nitrogen. Due to this configuration, deterioration due to oxidization can be prevented in the movable mirror unit 41, and durability against changes in the environment such as temperature can be improved.

The transparent member 20 is formed by a transparent member such as glass and resin. When the hermeticity is required inside the package, preferably, the material for the transparent member 20 is glass. When the hermeticity is not required inside the package, the material for the transparent member 20 may be resin.

The light-beam adjuster 10 is shaped like a triangular pole where the shape of the section is triangular, and is disposed to face the movable mirror unit 41 along the incident plane (YZ-plane) on which the incident light IL is incident. As illustrated in FIG. 2, the light-beam adjuster 10 includes a first rectangular plane 11 on which the incident light IL is incident, a second rectangular plane 12 that is bonded on the surface of the transparent member 20, and a third rectangular plane 13 that is formed to have an angle β with the second rectangular plane 12. Moreover, as illustrated in FIG. 1, the light-beam adjuster 10 has a fourth plane 14 and a fifth plane 15 that are triangular and parallel to each other.

The light-beam adjuster 10 is formed by a transparent member such as glass and resin. The light-beam adjuster 10 is disposed on the transparent member 20. When the light-beam adjuster 10 is disposed on the transparent member 20 in the present embodiment, the light-beam adjuster 10 is adjacent to the side of the transparent member 20 on which light is incident, and the light-beam adjuster 10 is directly or indirectly disposed on the surface of the transparent member 20.

Preferably, the light-beam adjuster 10 is bonded on the transparent member 20 with an optical adhesive such as an ultraviolet (UV)-curable resin and a thermosetting resin. In order to reduce the reflection light at the interface between the light-beam adjuster 10 and the transparent member 20, preferably, the refractive index of the light-beam adjuster 10 is almost the same as the refractive index of the transparent member 20.

Moreover, preferably, the expansion rate of the light-beam adjuster 10 is almost the same as the expansion rate of the transparent member 20. In such a configuration, the stress at the joint between the light-beam adjuster 10 and the transparent member 20, which is caused by a difference in linear expansion, is attenuated, and the durability improves. Preferably, the light-beam adjuster 10 and the transparent member 20 are made of the same material. For example, the light-beam adjuster 10 and the transparent member 20 are made of glass of the same type or resin of the same type.

When the size of the light-beam adjuster 10 is small (for example, when each side is equal to or shorter than 2 millimeters (mm)), it is desired that the light-beam adjuster 10 be formed by resin that is easier to process, rather than glass. For example, the transparent member 20 may be made of glass, and the light-beam adjuster 10 may be made of resin. Due to this configuration, a downsizing light-beam adjuster 10 can be formed while securing the hermeticity inside the package.

The third plane 13 is positioned between the optical path of the incident light IL that is incident on the movable mirror unit 41 and the optical path of the incident light IL (reflection light RL0) that is reflected by the movable mirror unit 41. The angle β that the third plane 13 forms with the second plane 12 is set to fall within the range of angle in which unnecessary reflection light RL2 is totally reflected. As will be described later in detail, the unnecessary reflection light RL2 is generated as the incident light IL is reflected by the transparent member 20. More specifically, the angle β or the like may be set such that the angle α that the unnecessary reflection light RL2 forms with the normal line of the third plane 13 will be equal to or wider than a critical angle and the unnecessary reflection light RL2 is totally reflected by the third plane 13. Note also that the unnecessary reflection light RL2 is the light reflected by the transparent member 20 and is not necessarily guided to a projection site.

For example, when the refractive index of the light-beam adjuster 10 is 1.5 (refractive index of glass) and the refractive index of the air is 1, the critical angle is about 42°. In such cases, the incident angle that the incident light IL forms with the light-beam adjuster 10, the shape, size, and the position of the light-beam adjuster 10, and the materials for the light-beam adjuster 10 and the transparent member 20 (refractive indexes) may be determined such that the value of the angle α will be wider than 42°. The term "critical angle" indicates the minimum incident angle where total reflection takes place when the light travels forward from a point with a large refractive index to a point with a small refractive index. Preferably, the angle β is 90° in view of the manufacturing cost. In other words, it is desired that the light-beam adjuster 10 be shaped like a right-angled triangular prism.

As will be described later in detail, due to the above configuration of the light-beam adjuster 10, the unnecessary reflection light RL2 is totally reflected by the third plane 13, and is guided to a direction other than the direction towards the screen 100 that serves as a projection site (target surface).

The position and size of the light-beam adjuster 10 may be configured such that each one of the length L between the fourth plane 14 and a side of the transparent member 20 and the length L' between the fifth plane 15 and the other side of the transparent member 20 will be equal to or wider than 0 in the X-direction (i.e., the main scanning direction). The position and size of the light-beam adjuster 10 are configured such that each one of the length M between a ridge line where the first plane 11 intersects with the second plane 12 and a side of the transparent member 20 and the length N between the third plane 13 and the optical scanning range in the sub-scanning direction will be equal to or wider than 0 in the Y-direction that is the sub-scanning direction.

In the present embodiment, the third plane 13 is a light-beam adjusting plane that adjusts the optical path of the unnecessary reflection light RL2.

When the position and size of the light-beam adjuster 10 are set as above and a plurality of light deflectors 1 are simultaneously manufactured at a wafer level, the light-beam adjusters 10 of those light deflectors 1 do not interfere with each other when the wafer is cut. Accordingly, the manufacturing becomes easier. In order to downsize the device, preferably, the size of the light-beam adjuster 10 is minimized in both the main scanning direction and the sub-scanning direction as long as the light-beam adjuster 10 includes an area through which light beams pass.

Once the incident light IL is incident on the light-beam adjuster 10 in the light deflector 1 as configured above, the incident light IL passes through the light-beam adjuster 10 and the transparent member 20 and is incident on the movable mirror unit 41. Once the incident light IL is reflected by the reflection plane 42 of the movable mirror unit 41, the incident light IL passes through the transparent member 20 again as the reflection light RL0, and is projected onto the screen 100. In such cases, the reflection light RL0 does not pass through the light-beam adjuster 10.

When there is a difference in refractive index on each interface in the optical path, reflection occurs on each interface. For example, reflection occurs on the first plane 11 of the light-beam adjuster 10 and the first plane 21 and the second plane 22 of the transparent member 20. In order to prevent such reflection, it is desired that a first antireflection layer 90 be formed in an area on the first plane 11 of the light-beam adjuster 10 through which the incident light IL passes. Moreover, it is desired that a second antireflection layer 91 be formed in an area on the second plane 22 of the transparent member 20 through which the incident light IL and the reflection light RL0 pass, and it is desired that a third antireflection layer 92 be formed in an area on the first plane 21 of the transparent member 20 through which the reflection light RL0 passes.

The first antireflection layer 90 may be formed on the entirety of the first plane 11. However, it is desired that the first antireflection layer 90 be circular or elliptical and include the area 60 through which the incident light IL passes and the area 62 through which the unnecessary reflection light RL2 passes. Preferably, the second antireflection layer 91 is rectangular or square-shaped to include an area through which the incident light IL passes and an area through which the reflection light RL0 that is optically scanned by the movable mirror unit 41 in two dimensions passes. Preferably, the third antireflection layer 92 is rectangular or square-shaped to include an area 61 through which the reflection light RL0 that is optically scanned by the movable mirror unit 41 in two dimensions passes.

Even with the provision of the first to third antireflection layers 90 to 92, it is difficult to prevent the reflection in a complete manner. For example, the unnecessary reflection light RL1 occurs on the first plane 11 of the light-beam adjuster 10, and the unnecessary reflection light RL2 occurs on the second plane 22 of the transparent member 20.

In the light deflector 1 according to the present embodiment, the unnecessary reflection light RL1 that occurs on the first plane 11 of the light-beam adjuster 10 is guided to an area outside the screen 100 in its entirety. The unnecessary reflection light RL2 that occurs on the transparent member 20 is totally reflected by the third plane 13 of the light-beam adjuster 10, and is guided to an area outside the screen 100, passing through the first plane 11 again. As described above, according to the present embodiment, unnecessary reflection light is guided to an area outside the screen 100. Accordingly, an image with a small amount of noise can be obtained.

As described above, it is satisfactory as long as the light-beam adjuster 10 that adjusts the optical paths of incident light and reflection light is disposed only at an area through which the incident light and the reflection light pass. For this reason, the unnecessary reflection light that is caused at a transparent member can be guided to an area other than projection site with a relatively simple configuration. Moreover, the size of the device can be reduced. Further, manufacturing of the light-beam adjuster is easy, and mounting of the light-beam adjuster 10 on the transparent member 20 is also easy. Accordingly, the manufacturing process can be simplified, and the production cost can be reduced.

Modification of First Embodiment

A modification of the light deflector 1 according to the first embodiment of the present disclosure is described below.

Figure 3:
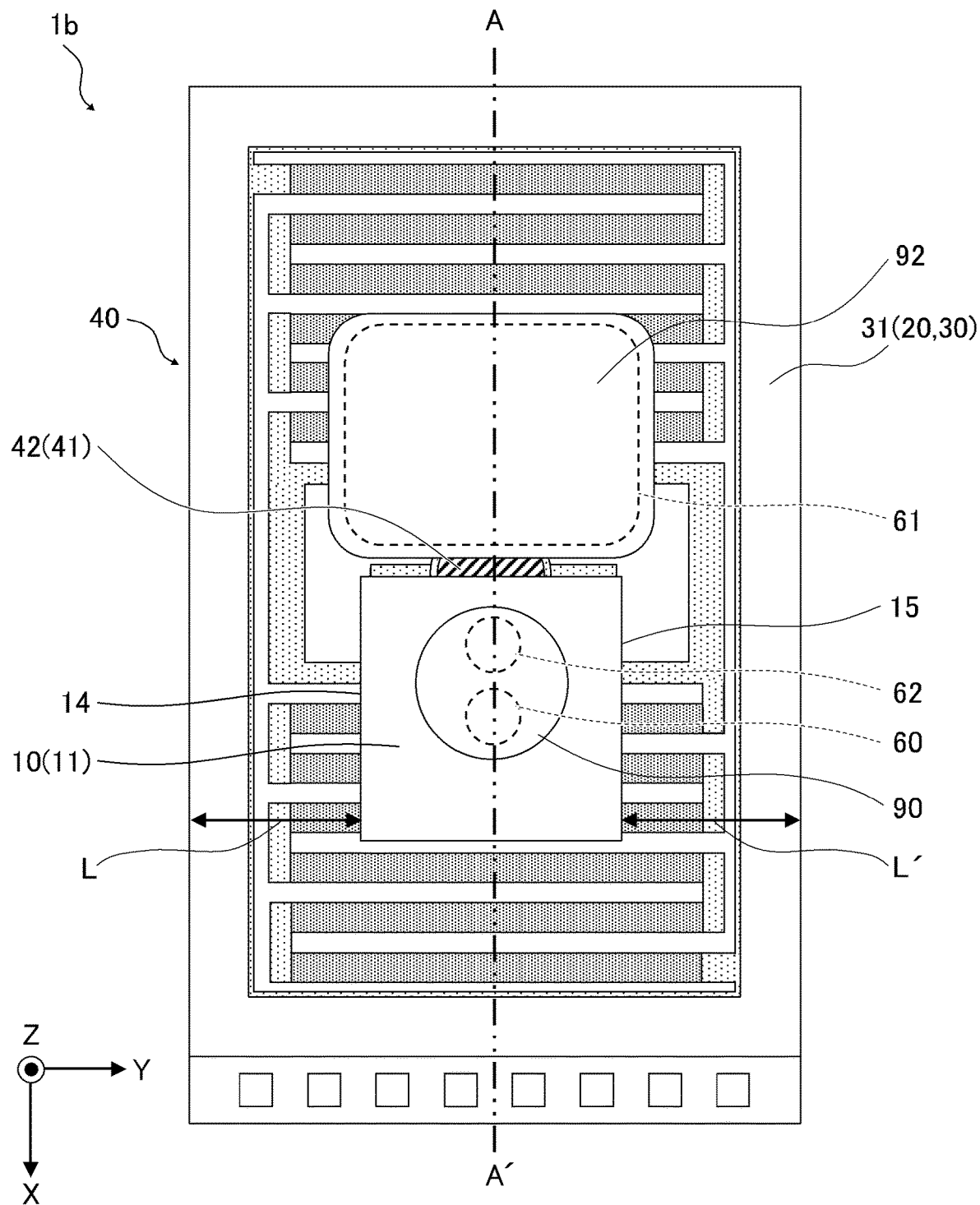
FIG. 3 is a plan view of a configuration of a light deflector according to a modification of the first embodiment of the present disclosure.

FIG. 3 is a plan view of a light deflector 1b according to the present modification of the first embodiment.

In the light deflector 1b, the light-beam adjuster 10 is arranged such that the incident light IL is incident on the first plane 11 of the light-beam adjuster 10 from the +Y-direction (from the bottom side FIG. 3). The A-A' sectional view of FIG. 3 is similar to the sectional view in FIG. 2. Also in the present modification, the first to third antireflection layers 90 to 92 may be formed in accordance with each of the areas through which the incident light IL, the unnecessary reflection light RL2, and the reflection light RL0 pass. A similar modification is possible also in the other embodiments of the present disclosure described below.

Second Embodiment

A second embodiment of the present disclosure is described below.

Figure 4:
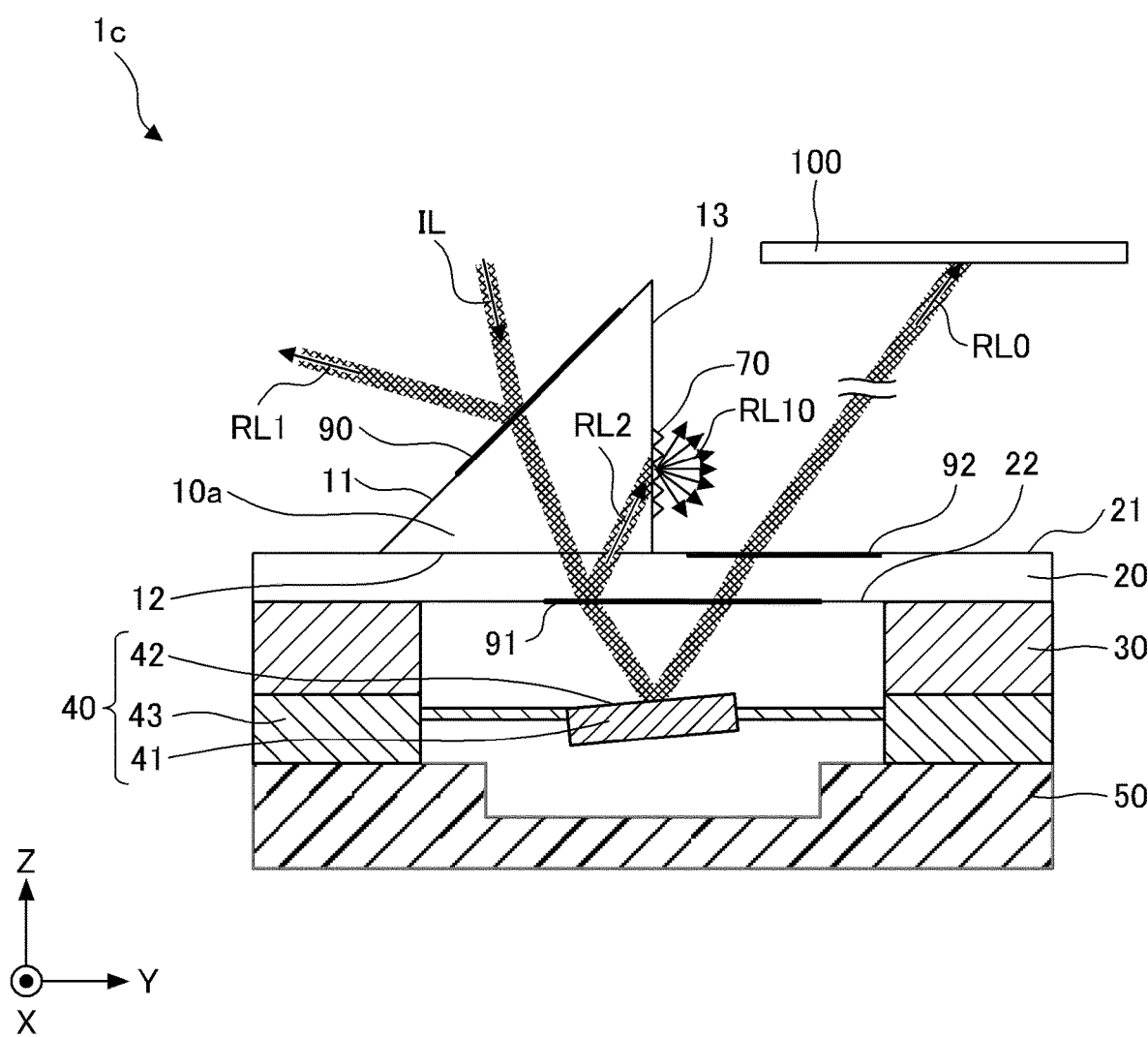
FIG. 4 is a sectional view of a configuration of a light deflector according to a second embodiment of the present disclosure.

FIG. 4 is a sectional view of a configuration of a light deflector 1c according to the second embodiment of the present disclosure.

The plan view of the present embodiment is similar to the plan views of FIG. 1 and FIG. 3, and thus is omitted. The light deflector 1c according to the second embodiment has a configuration similar to that of the light deflector 1 according to the first embodiment, except that some of the configuration of the light-beam adjuster is different. Note that like reference signs are given to elements similar to those described in the first embodiment, and their detailed description is omitted.

A light-beam adjuster 10a has concave and convex parts 70 on some of or the entirety of the third plane 13. In the present embodiment, the concave and convex parts 70 are partially formed on the third plane 13 to include the area on which the unnecessary reflection light RL2 is incident. The third plane 13 where the concave and convex parts 70 are provided is positioned between the optical path of the incident light IL that is incident on the movable mirror unit 41 and the optical path of the reflection light RL0 that is reflected by the movable mirror unit 41.

For example, the materials, shape, size, and the position of the light-beam adjuster 10a as well as how the light-beam adjuster 10a is mounted on the transparent member 20 are similar to those of the first embodiment.

Preferably, the concave and convex parts 70 are formed when the light-beam adjuster 10a is being manufactured. The concave and convex parts 70 can be formed by roughening the third plane 13 by sandblasting or the like. However, in view of the cost, it is desired that, for example, the concave and convex processed surface that is caused by grinding or cutting be used as the concave and convex parts 70 just as it is when the material for the light-beam adjuster 10a is glass. When the light-beam adjuster 10a is manufactured using resin with metal molding such as injection molding, preferably, the concave and convex parts 70 are formed by applying micro concave and convex parts to the mold.

Once the incident light IL is incident on the light-beam adjuster 10 in the light deflector 1c as configured above, the incident light IL passes through the light-beam adjuster 10a and the transparent member 20 and is incident on the movable mirror unit 41. Once the incident light IL is reflected by the reflection plane 42 of the movable mirror unit 41, the incident light IL passes through the transparent member 20 again as the reflection light RL0, and is projected onto the screen 100. In such cases, the reflection light RL0 does not pass through the light-beam adjuster 10a.

In a similar manner to the first embodiment, preferably, the first to third antireflection layers 90 to 92 are provided also in the present embodiment. However, it is difficult to prevent the reflection in a complete manner. In a similar manner to the first embodiment, the unnecessary reflection light RL1 occurs on the first plane 11 of the light-beam adjuster 10a, and the unnecessary reflection light RL2 occurs on the second plane 22 of the transparent member 20.

Figure 5:
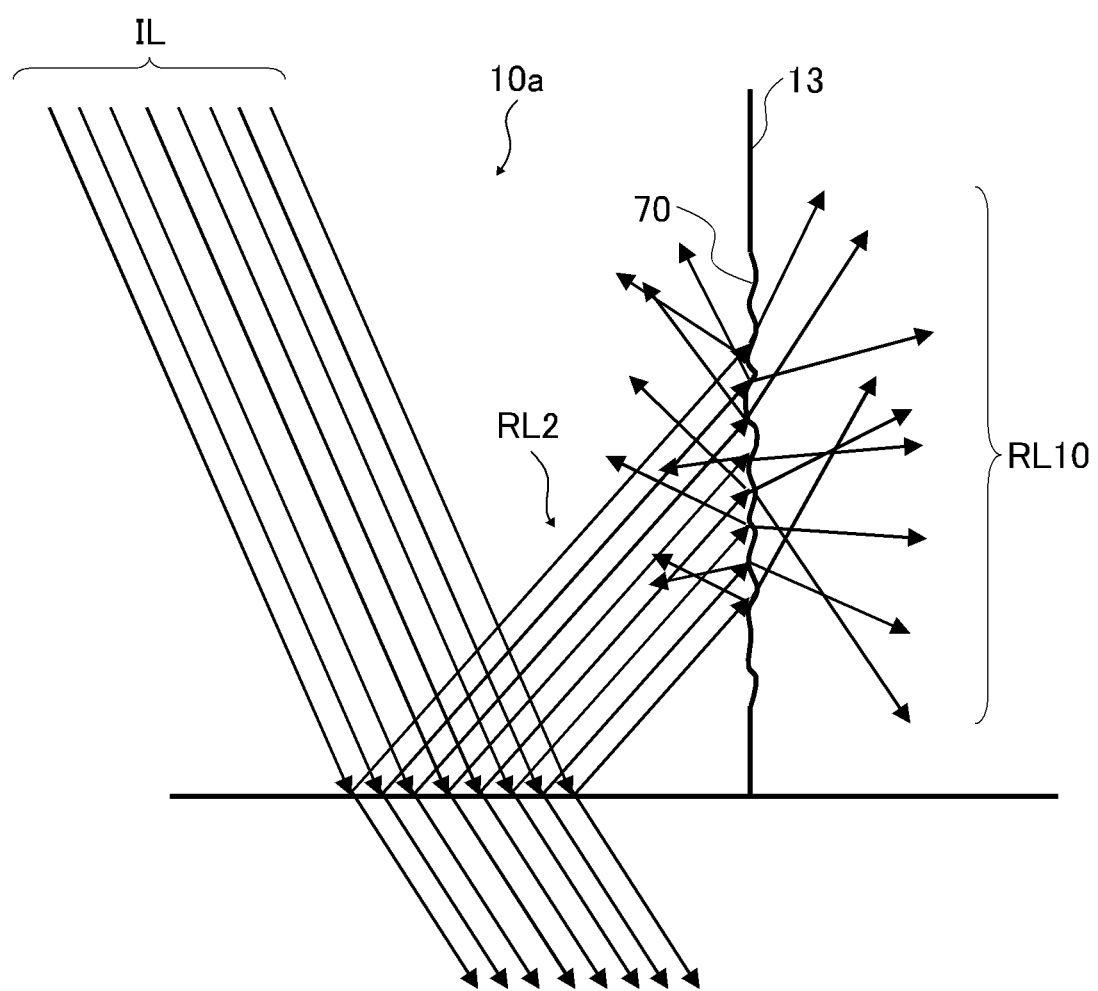
FIG. 5 is a diagram illustrating how unnecessary reflected light is scattered at concave and convex parts.

In the light deflector 1c according to the present embodiment, the unnecessary reflection light RL1 that occurs on the first plane 11 of the light-beam adjuster 10a is guided to an area outside the screen 100 in its entirety. As illustrated in FIG. 5, the unnecessary reflection light RL2 that occurs on the transparent member 20 is scattered by the concave and convex parts 70 provided for the third plane 13 of the light-beam adjuster 10a, and exits from light-beam adjuster 10a as scattered light RL10. Although some of the scattered light RL10 is emitted towards the screen 100, the light intensity of the scattered light RL10 is relatively weak. Accordingly, an image with a small amount of noise can be obtained.

Third Embodiment

A third embodiment of the present disclosure is described below.

Figure 6:
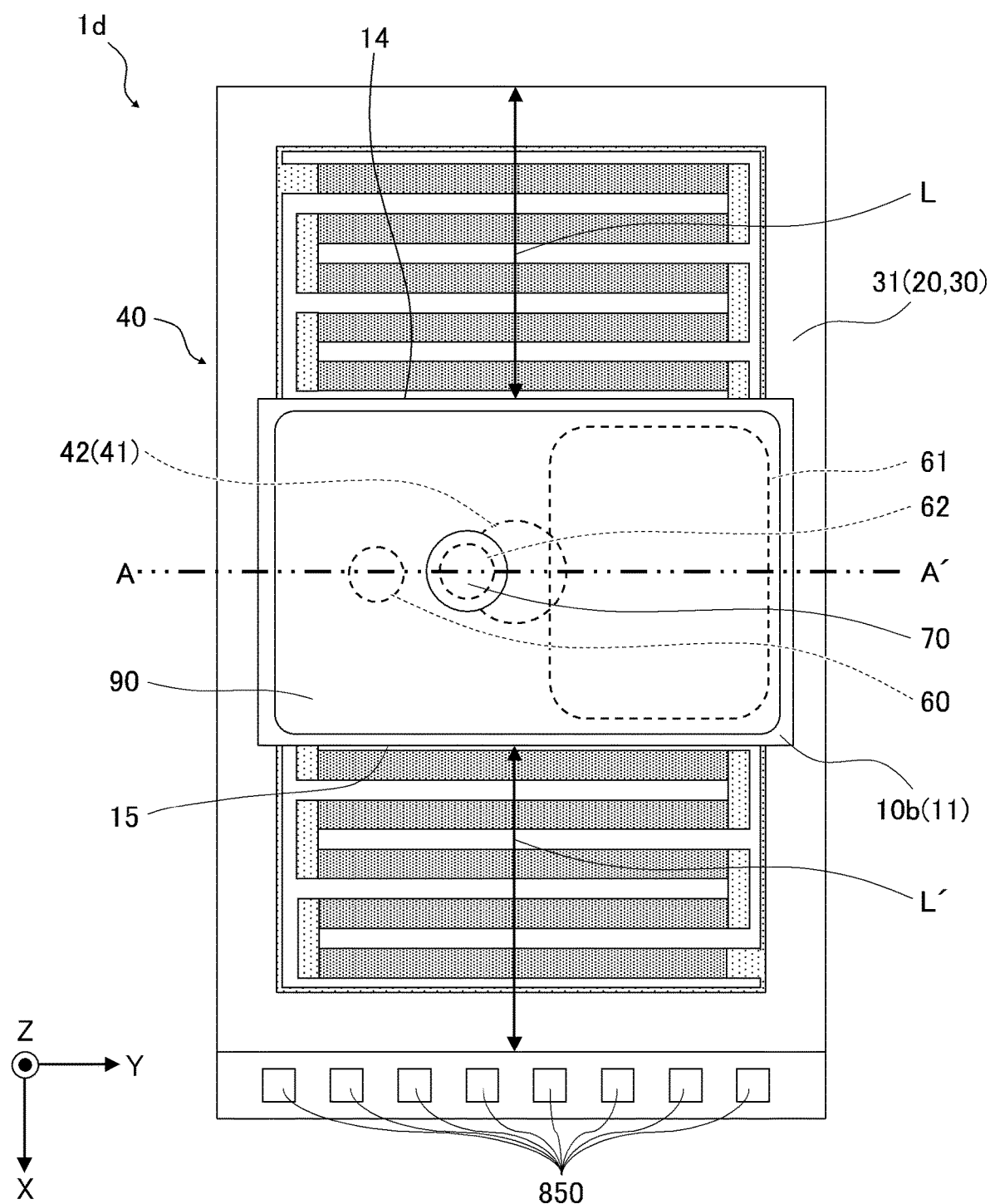
FIG. 6 is a plan view of a configuration of a light deflector according to a third embodiment of the present disclosure.

FIG. 6 is a plan view of a configuration of a light deflector 1d according to the third embodiment.

Figure 7:
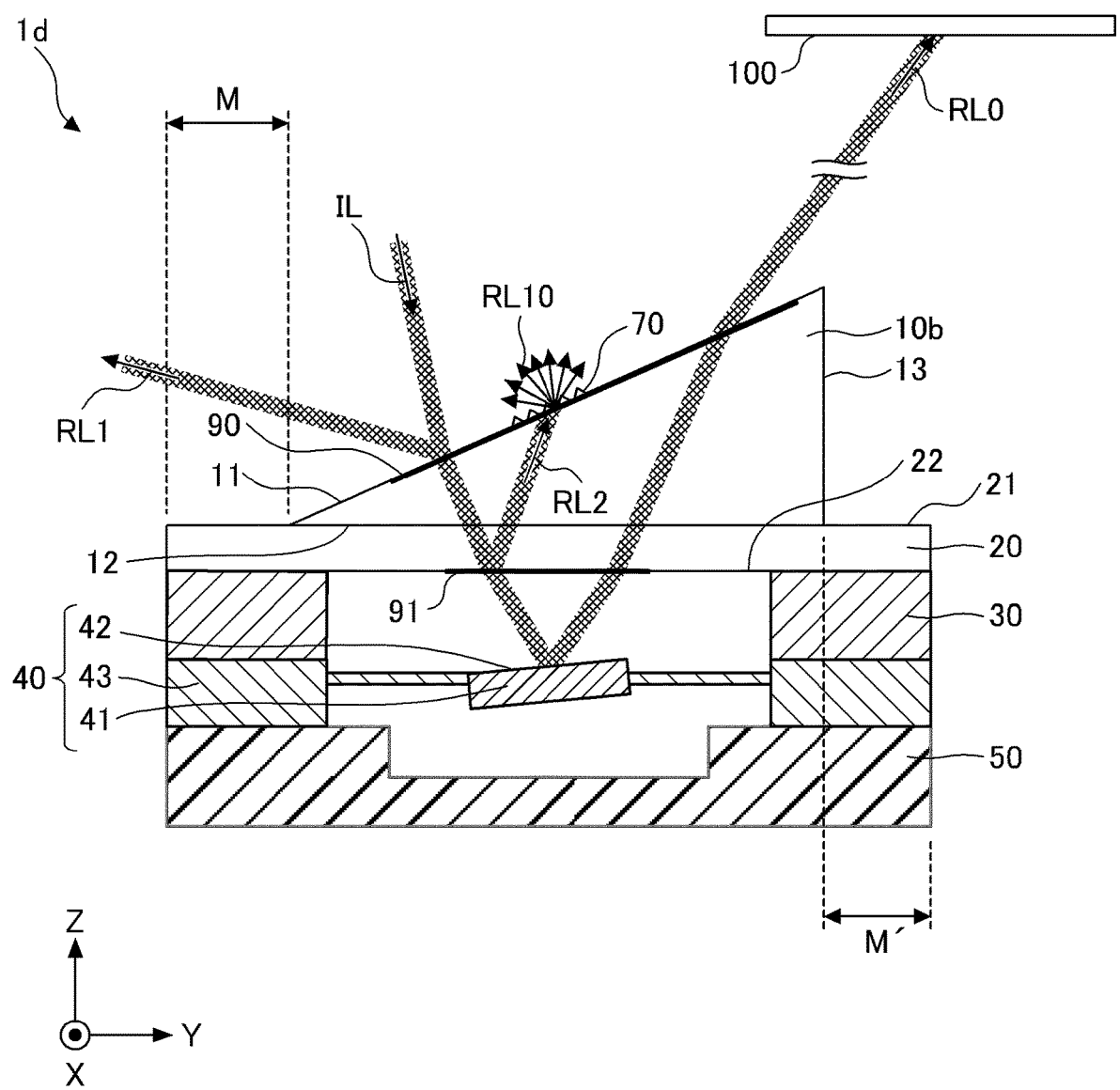
FIG. 7 is a A-A' sectional view of FIG. 6.

FIG. 7 is a A-A' sectional view of FIG. 6.

The light deflector 1d according to the third embodiment has a configuration similar to that of the light deflector 1 according to the first embodiment, except for configurations of the light-beam adjuster and the antireflection layer. Note that like reference signs are given to elements similar to those described in the first embodiment, and their detailed description is omitted.

In a similar manner to the first embodiment, a light-beam adjuster 10b is shaped like a triangular pole. The position and size of the light-beam adjuster 10b in the X-direction that is the main scanning direction are similar to those of the first embodiment. Moreover, the position and size of the light-beam adjuster 10b in the Y-direction that is the sub-scanning direction is set such that the incident light IL, the unnecessary reflection light RL2, and the reflection light RL0 that has been optically scanned by the movable mirror unit 41 in two dimensions pass through the first plane 11. Accordingly, in the present embodiment, the light-beam adjusting plane is the same as the first plane 11 on which the incident light IL is incident.

For example, the materials and shape of the light-beam adjuster 10b as well as how the light-beam adjuster 10b is mounted on the transparent member 20 are similar to those of the first embodiment.

The light-beam adjuster 10b has a concave and convex parts 70 on a part of the first plane 11. In the present embodiment, the concave and convex parts 70 are positioned between the optical path of the incident light IL that is incident on the movable mirror unit 41 and the optical path of the reflection light RL0 that is reflected by the movable mirror unit 41.

The concave and convex parts 70 are formed in a circular or elliptical shape to include the area 62 on the first plane 11 on which the unnecessary reflection light RL2 is incident. A method of forming the concave and convex parts 70 according to the present embodiment is similar to that of the second embodiment of the present disclosure.

Moreover, the position and size of the light-beam adjuster 10b is set such that each one of the length M between a ridge line where the first plane 11 intersects with the second plane 12 and a side of the transparent member 20 and the length M' between the third plane 13 and the other side of the transparent member 20 will be equal to or wider than 0.

When the position and size of the light-beam adjuster 10b are set as above and a plurality of light deflectors 1d are simultaneously manufactured at a wafer level, the light-beam adjusters 10b of those light deflectors 1d do not interfere with each other when the wafer is cut. Accordingly, the manufacturing becomes easier. In order to downsize the device, preferably, the size of the light-beam adjuster 10b is minimized in both the main scanning direction and the sub-scanning direction as long as the light-beam adjuster 10b includes an area through which light beams pass.

Once the incident light IL is incident on the light-beam adjuster 10 in the light deflector 1d as configured above, the incident light IL passes through the light-beam adjuster 10b and the transparent member 20 and is incident on the movable mirror unit 41. Once the incident light IL is reflected by the reflection plane 42 of the movable mirror unit 41, the incident light IL passes through the transparent member 20 and the light-beam adjuster 10b again as the reflection light RL0, and is projected onto the screen 100.

When there is a difference in refractive index on each interface in the optical path, reflection occurs on each interface. For example, reflection occurs on the first plane 11 of the light-beam adjuster 10b and the second plane 22 of the transparent member 20. In order to prevent such reflection, it is desired that a first antireflection layer 90 be formed on the first plane 11 of the light-beam adjuster 10b, and it is desired that a second antireflection layer 91 be formed on the second plane 22 of the transparent member 20.

The first antireflection layer 90 may be formed on the entirety of the first plane 11. However, no limitation is indicated thereby, and the first antireflection layer 90 may separately and individually be formed on the area 60 through which the incident light IL passes, on the area 62 through which the unnecessary reflection light RL2 passes, and on the area 61 through which the reflection light RL0 passes. Preferably, the second antireflection layer 91 is rectangular-shaped or square-shaped to include an area through which the incident light IL passes and an area through which the reflection light RL0 passes.

Even if the first antireflection layer 90 and the second antireflection layer 91 are provided, it is difficult to prevent the reflection in a complete manner. For example, the unnecessary reflection light RL1 occurs on the first plane 11 of the light-beam adjuster 10b, and the unnecessary reflection light RL2 occurs on the second plane 22 of the transparent member 20.

In the light deflector 1d according to the present embodiment, the unnecessary reflection light RL1 that occurs on the first plane 11 of the light-beam adjuster 10b is guided to an area outside the screen 100 in its entirety. The unnecessary reflection light RL2 that occurs on the transparent member 20 passes through the inside of the light-beam adjuster 10b and is scattered by the concave and convex parts 70 provided for the first plane 11 of the light-beam adjuster 10b, and then exits from light-beam adjuster 10b as scattered light RL10. Although some of the scattered light RL10 is emitted towards the screen 100, the light intensity of the scattered light RL10 is relatively weak. Accordingly, an image with a small amount of noise can be obtained.

Fourth Embodiment

A fourth embodiment of the present disclosure is described below.

Figure 8:
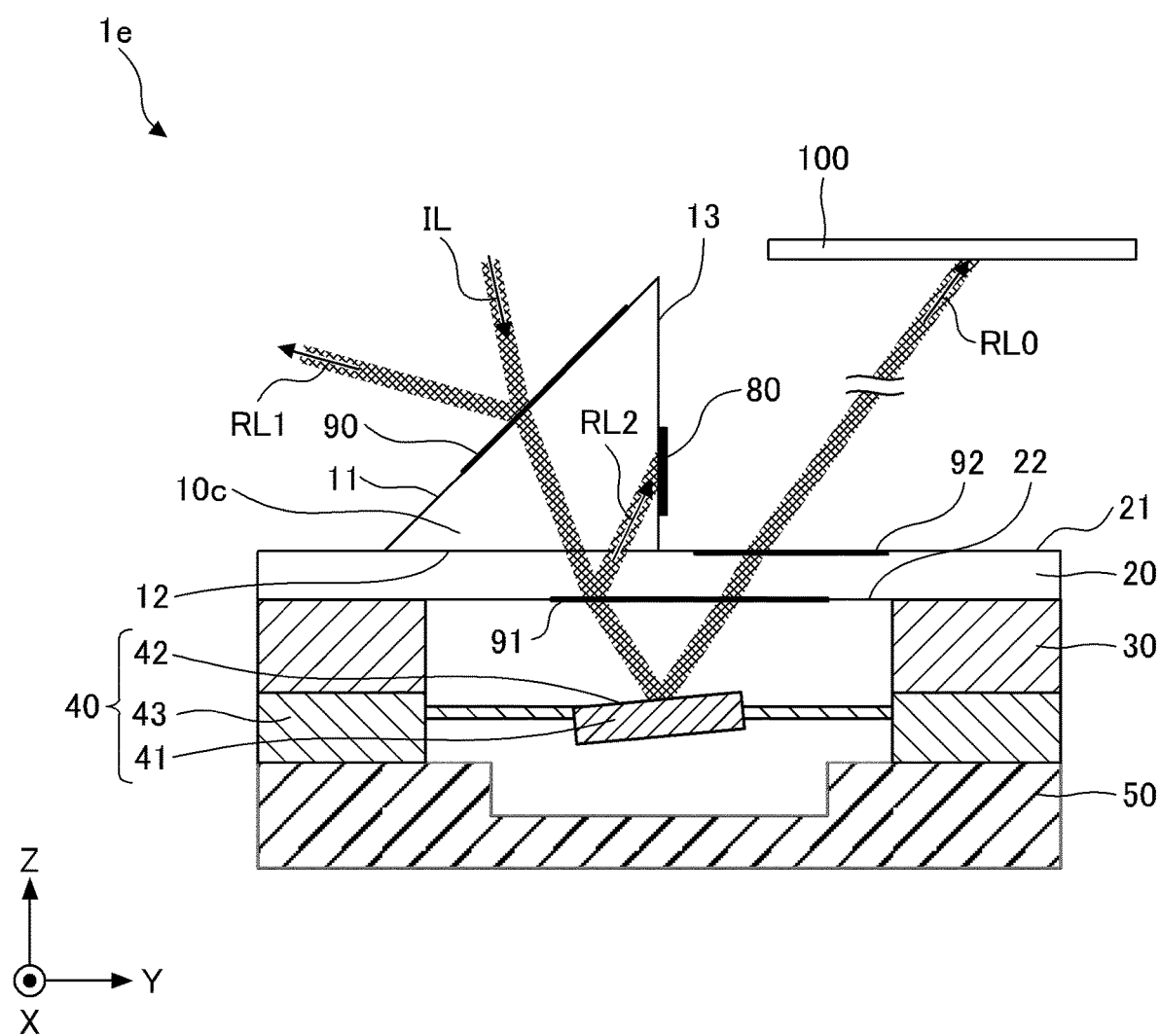
FIG. 8 is a sectional view of a configuration of a light deflector according to a fourth embodiment of the present disclosure.

FIG. 8 is a sectional view of a configuration of a light deflector 1e according to the fourth embodiment of the present disclosure.

The plan view of the present embodiment is similar to the plan views of FIG. 1 and FIG. 3, and thus is omitted. The light deflector 1e according to the fourth embodiment has a configuration similar to that of the light deflector 1c according to the second embodiment, except that a light-beam adjuster 10c provided with a light-shielding layer 80 is used in place of the concave and convex parts 70.

The light-beam adjuster 10c has a light-shielding layer 80 on some of or the entirety of the third plane 13. In the present embodiment, the light-shielding layer 80 is partially formed on the third plane 13 to include the area on which the unnecessary reflection light RL2 is incident. The third plane 13 on which the light-shielding layer 80 is formed is positioned between the optical path of the incident light IL that is incident on the movable mirror unit 41 and the optical path of the reflection light RL0 that is reflected by the movable mirror unit 41.

Preferably, the light-shielding layer 80 is formed by a material coated by ink or a metallic evaporated film made of aluminum (Al) or the like, which is used for general-purpose optical lenses.

In the light deflector 1e according to the present embodiment, the unnecessary reflection light RL1 that occurs on the first plane 11 of the light-beam adjuster 10c is guided to an area outside the screen 100 in its entirety. The unnecessary reflection light RL2 that occurs on the transparent member 20 is shielded by the light-shielding layer 80 disposed on the third plane 13 of the light-beam adjuster 10c. As a result, an image with a small amount of noise can be obtained. Compared with the first embodiment of the present disclosure, the configuration according to the present embodiment is especially effective in a configuration where the light that is incident on the third plane 13 is not totally reflected.

Fifth Embodiment

A fifth embodiment of the present disclosure is described below.

Figure 9:
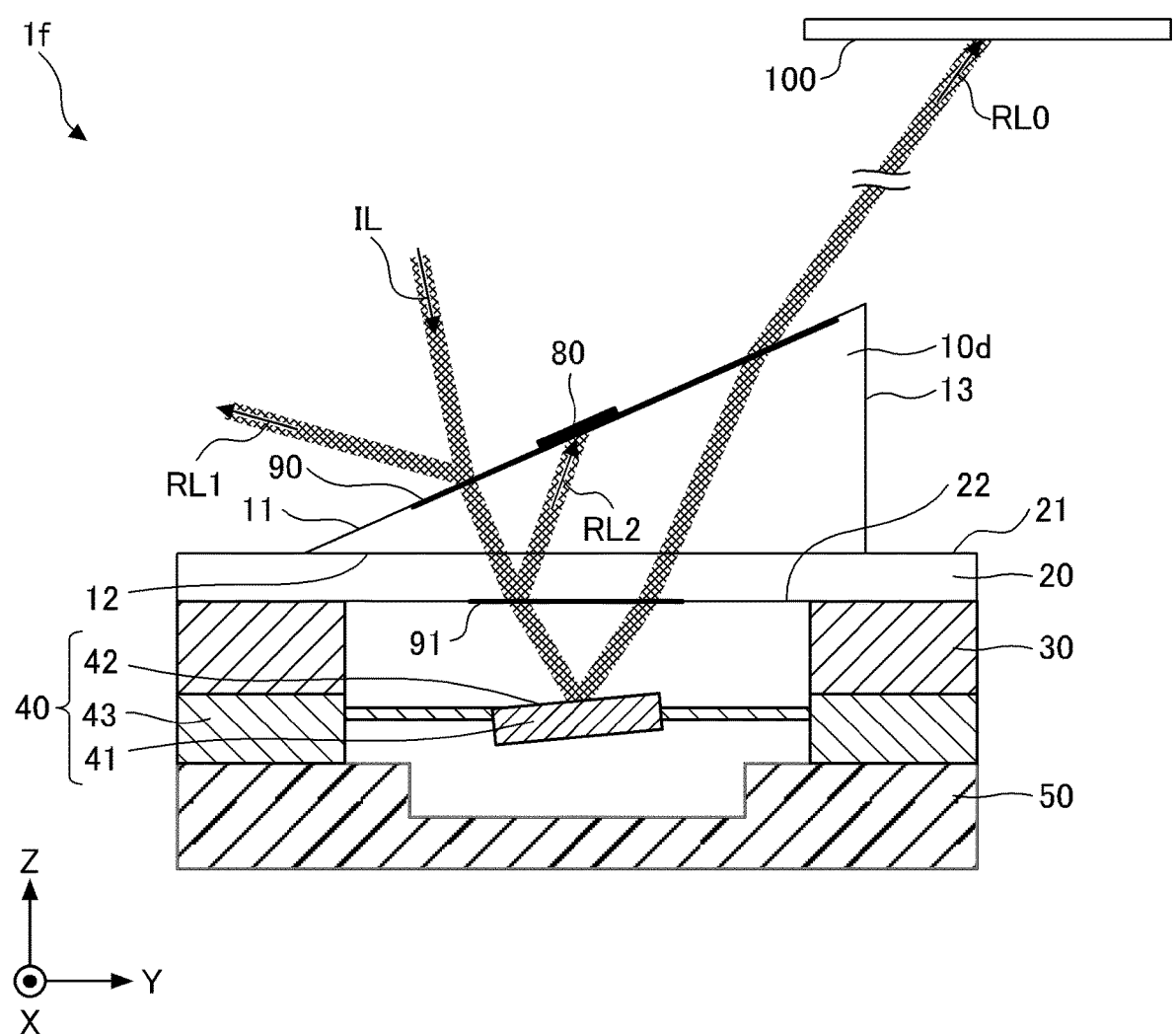
FIG. 9 is a sectional view of a configuration of a light deflector according to a fifth embodiment of the present disclosure.

FIG. 9 is a sectional view of a configuration of a light deflector 1f according to the fifth embodiment of the present disclosure.

The plan view of the present embodiment is similar to the plan views of FIG. 6, and thus is omitted. The light deflector 1f according to the fifth embodiment has a configuration similar to that of the light deflector 1d according to the third embodiment, except that the light-beam adjuster 10d provided with the light-shielding layer 80 is used in place of the concave and convex parts 70.

The light-beam adjuster 10d has a light-shielding layer 80 on a part of the first plane 11. In the present embodiment, the light-shielding layer 80 is formed to include the area on the first plane 11 on which the unnecessary reflection light RL2 is incident. A method of forming the light-shielding layer 80 is similar to that of the fourth embodiment.

In the light deflector 1f according to the present embodiment, the unnecessary reflection light RL1 that occurs on the first plane 11 of the light-beam adjuster 10d is guided to an area outside the screen 100 in its entirety. The unnecessary reflection light RL2 that occurs on the transparent member 20 passes through the inside of the light-beam adjuster 10d and is shielded by the light-shielding layer 80 disposed on the first plane 11. As a result, an image with a small amount of noise can be obtained.

Sixth Embodiment

A sixth embodiment of the present disclosure is described below.

Figure 10:
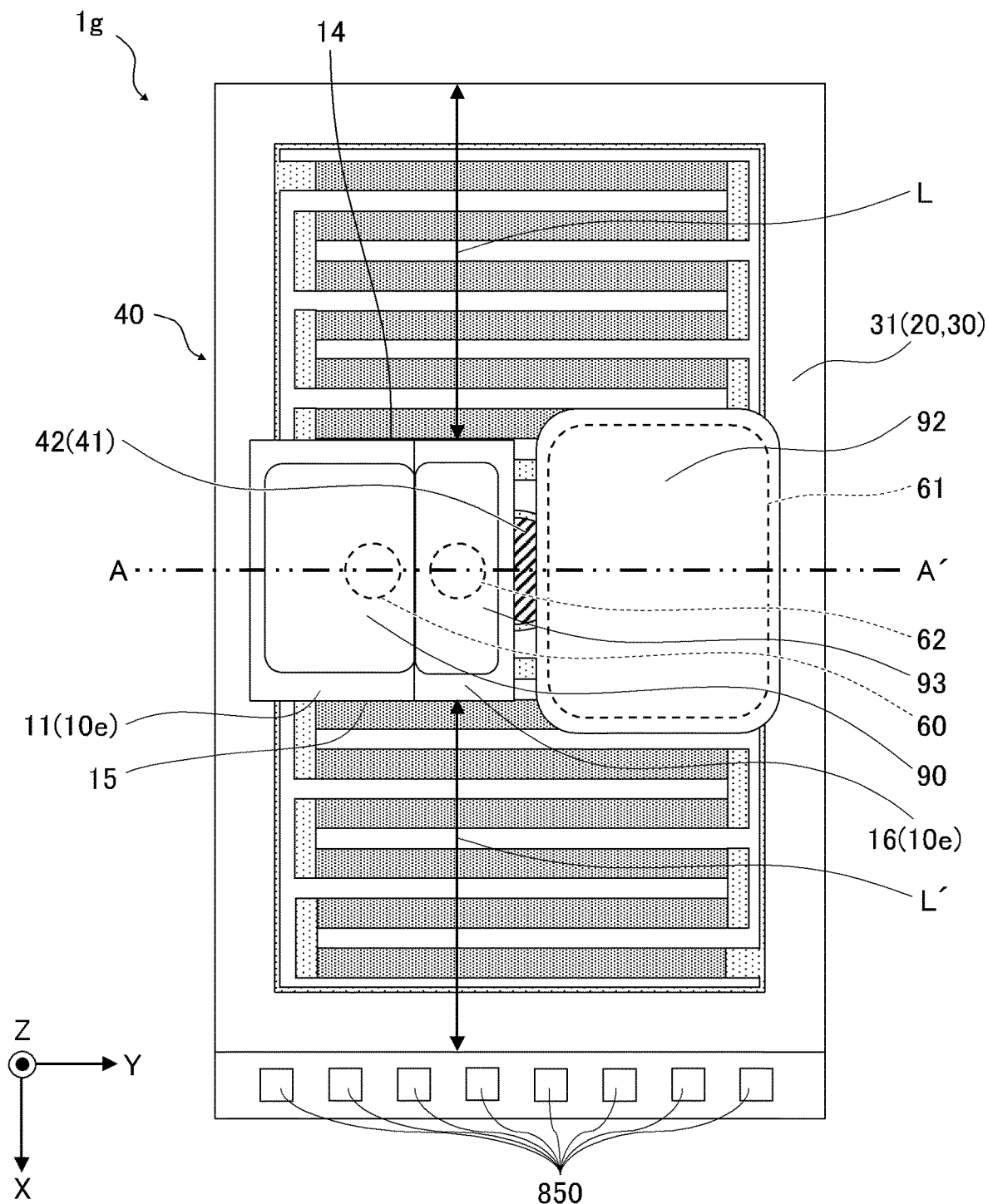
FIG. 10 is a plan view of a configuration of a light deflector according to a sixth embodiment of the present disclosure.

FIG. 10 is a plan view of a configuration of a light deflector 1g according to the sixth embodiment of the present disclosure.

Figure 11:
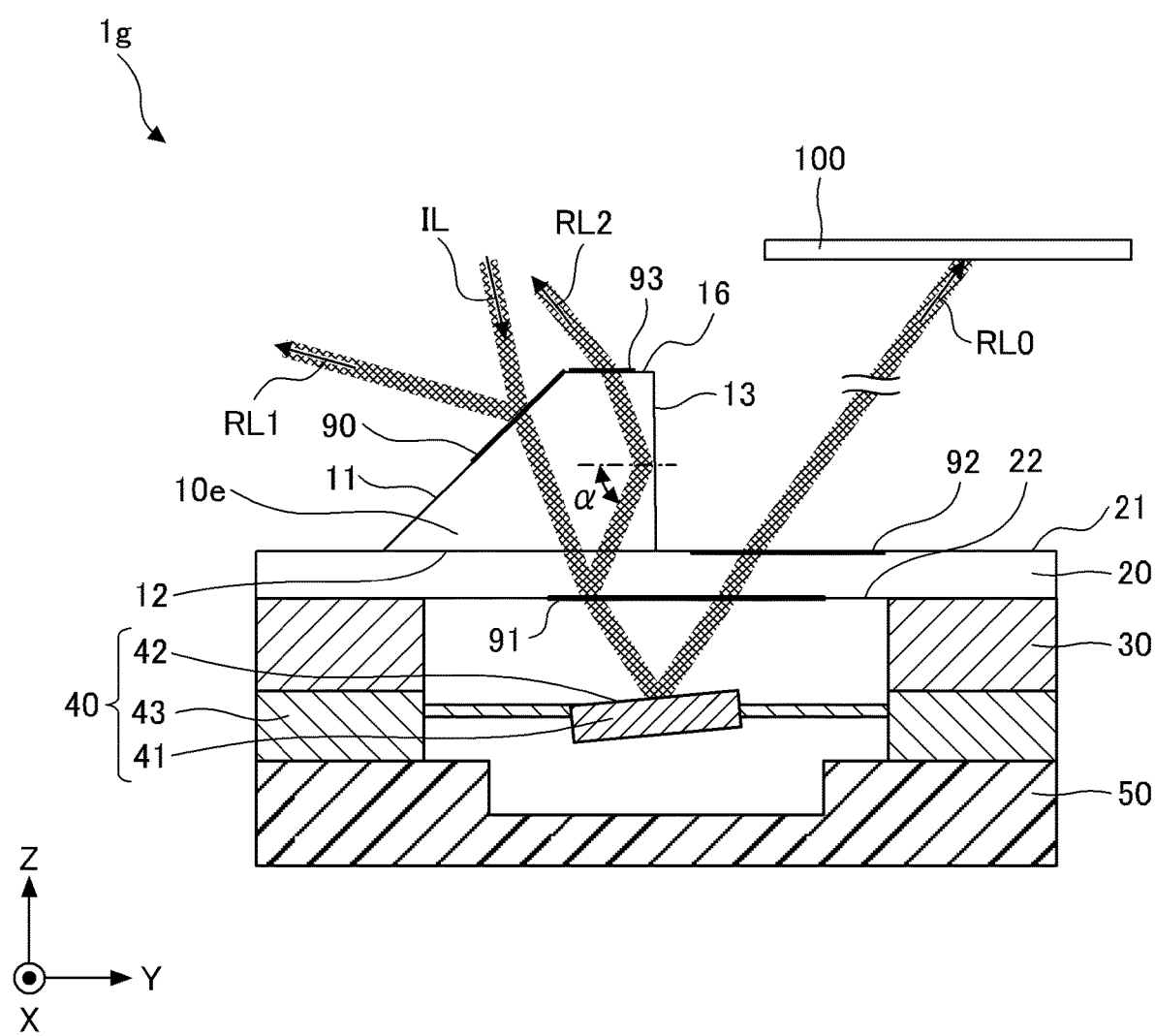
FIG. 11 is a A-A' sectional view of FIG. 10.

FIG. 11 is a A-A' sectional view of FIG. 10.

The light deflector 1g according to the sixth embodiment has a configuration similar to that of the light deflector 1 according to the first embodiment, except that some of the configuration of the light-beam adjuster is different. Note that like reference signs are given to elements similar to those described in the first embodiment, and their detailed description is omitted.

A light-beam adjuster 10e according to the present embodiment is different from the light-beam adjuster 10 according to the first embodiment. In particular, a light-beam adjuster 10e is shaped like a quadrangular pole where the shape of the section is trapezoidal, and is disposed to face the reflection plane 42 of the movable mirror unit 41 along the incident plane on which the incident light IL is incident. In the light-beam adjuster 10e, the sixth plane 16 is formed in addition to the above-described first to fifth planes 11 to 15.

In the light-beam adjuster 10 according to the first embodiment of the present disclosure, the sixth plane 16 is formed by cutting a ridge line where the first plane 11 intersects with third plane 13, along the plane orthogonal to the plane on which the incident light IL is incident. In the present embodiment, the sixth plane 16 is parallel with the second plane 12. The sixth plane 16 is disposed at a position on which the unnecessary reflection light RL2 that is totally reflected by the third plane 13 is incident.

In the light-beam adjuster 10e, a fourth antireflection layer 93 be formed on some of or the entirety of the sixth plane 16. In the present embodiment, the fourth antireflection layer 93 is formed to include an area 62 on the sixth plane 16 through which the reflection light RL2 passes. In a similar manner to the first embodiment, the first antireflection layer 90 is formed on some of or the entirety of the first plane 11 so as to include an area 60 through which the incident light IL passes.

In the present embodiment, the third plane 13 and the sixth plane 16 of the light-beam adjuster 10e are positioned between the optical path of the incident light IL that is incident on the movable mirror unit 41 and the optical path of the reflection light RL0 that is reflected by the movable mirror unit 41. In a similar manner to the first embodiment as described above, the third plane 13 is formed such that the angle α that the unnecessary reflection light RL2 forms with the normal line of the third plane 13 will be equal to or wider than a critical angle.

Once the incident light IL is incident on the first plane 11 of the light-beam adjuster 10e in the light deflector 1d as configured above, the incident light IL passes through the light-beam adjuster 10e and the transparent member 20 and is incident on the movable mirror unit 41. Once the incident light IL is reflected by the reflection plane 42 of the movable mirror unit 41, the incident light IL passes through the transparent member 20 again as the reflection light RL0, and is projected onto the screen 100. In such cases, the reflection light RL0 does not pass through the light-beam adjuster 10e.

In the light deflector 1d according to the present embodiment, the unnecessary reflection light RL1 that occurs on the first plane 11 of the light-beam adjuster 10e is guided to an area outside the screen 100 in its entirety. The unnecessary reflection light RL2 that occurs on the transparent member 20 is totally reflected by the third plane 13 of the light-beam adjuster 10e, and is incident on the sixth plane 16. The unnecessary reflection light RL2 that is incident on the sixth plane 16 is deflected by the sixth plane 16. Accordingly, the path is changed and the reflection light is guided to an area outside the screen 100. As a result, an image with a small amount of noise can be obtained.

Preferably, the unnecessary reflection light RL2 is guided to a direction other than the direction towards the light-source device (for example, a laser diode (LD)) that emits the incident light IL as the path is changed by the sixth plane 16. Due to this configuration, an adverse effect such as a damage caused to the light-source device due to a phenomenon in which the unnecessary reflection light RL2 returns to the light-source device can be prevented.

In the present embodiment, a light-beam adjuster 10e is shaped like a trapezoidal pole where the shape of the section is trapezoidal, and is disposed to face the reflection plane 42 of the movable mirror unit 41 along the incident plane on which the incident light IL is incident. Accordingly, the sixth plane 16 is parallel with the second plane 12 in the present embodiment, and thus processing can be performed easily.

However, the shape in cross section is not limited to a trapezoid, but may be other kinds of rectangles or a polygon whose number of size is equal to or larger than five. Further, the corners may be rounded in order to reduce a defect such as a crack at a corner of the light-beam adjuster 10e.

Modification of Sixth Embodiment

First and second modifications of the light deflector 1g according to the sixth embodiment of the present disclosure is described below.

Figure 12:
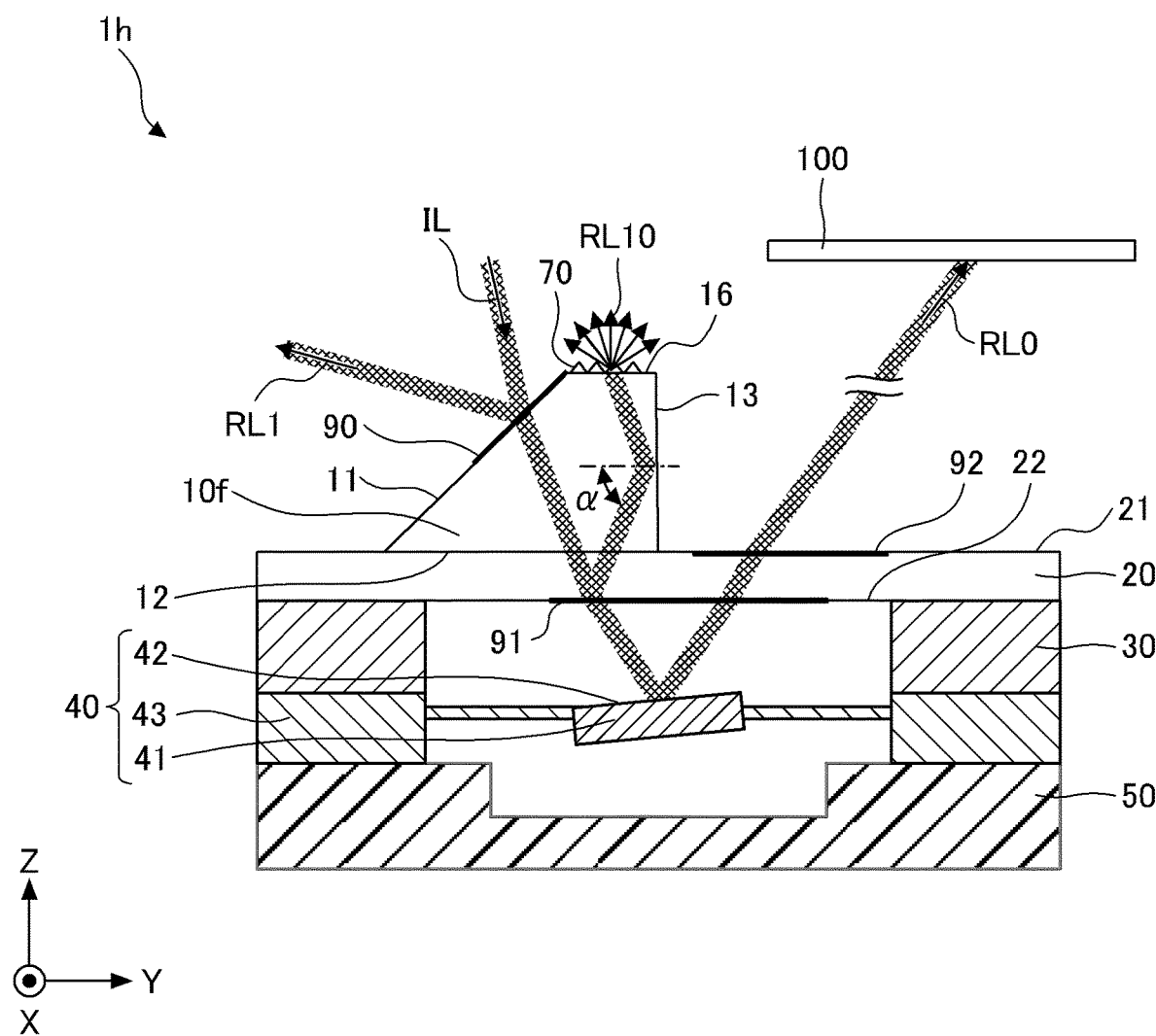
FIG. 12 is a sectional view according to a first modification of the sixth embodiment of the present disclosure.

FIG. 12 is a sectional view of a light deflector 1h according to the first modification of the sixth embodiment of the present disclosure.

The light deflector 1h has a configuration similar to that of the light deflector 1g according to the sixth embodiment, except that a light-beam adjuster 10f provided with the concave and convex parts 70 is used in place of the light-shielding layer 80. The concave and convex parts 70 is formed on some of or the entirety of the sixth plane 16 so as to include an area 62 through which the reflection light RL2 passes. In the light deflector 1h, the unnecessary reflection light RL2 that is totally reflected by the third plane 13 and is incident on the sixth plane 16 is scattered by the concave and convex parts 70, and exits as the scattered light RL10.

Figure 13:
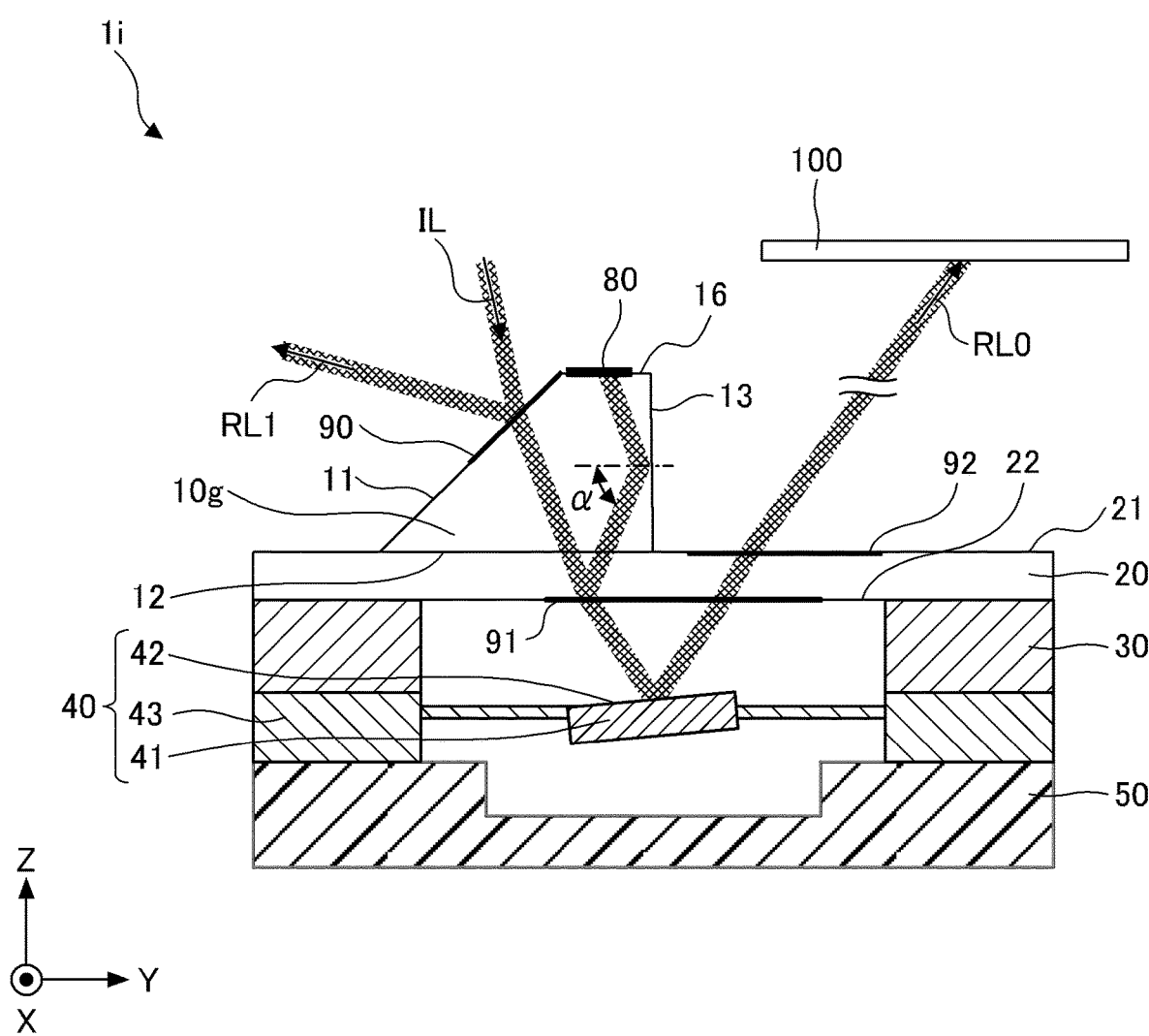
FIG. 13 is a sectional view according to a second modification of the sixth embodiment of the present disclosure.

FIG. 13 is a sectional view of a light deflector 1i according to the second modification of the sixth embodiment of the present disclosure.

The light deflector 1i has a configuration similar to that of the light deflector 1g according to the sixth embodiment, except that a light-beam adjuster 10g provided with the light-shielding layer 80 is used in place of the fourth antireflection layer 93. The light-shielding layer 80 is formed on some of or the entirety of the sixth plane 16 so as to include an area 62 through which the reflection light RL2 passes. In the light deflector 1i, the unnecessary reflection light RL2 that is totally reflected by the third plane 13 and is incident on the sixth plane 16 is shielded by the light-shielding layer 80.

In both the first and second modifications, the unnecessary reflection light RL2 is prevented from being guided to the screen, and the unnecessary reflection light RL2 is prevented from returning to the light-source device. Due to this configuration, the image quality improves, and an adverse effect such as a damage caused to the light-source device can be prevented.

Seventh Embodiment

A seventh embodiment of the present disclosure is described below.

Figure 14:
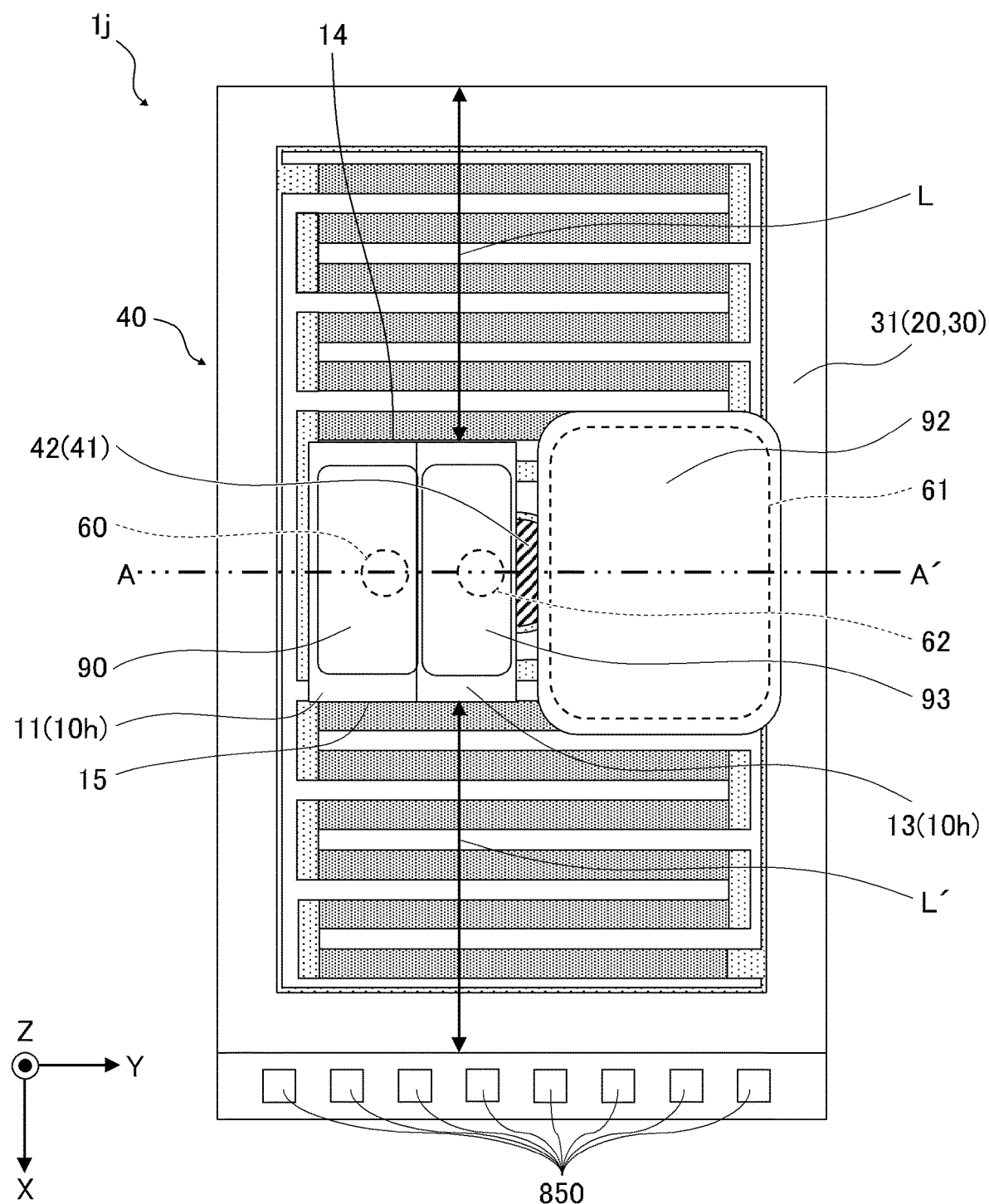
FIG. 14 is a plan view of a configuration of a light deflector according to a seventh embodiment of the present disclosure.

FIG. 14 is a plan view of a configuration of a light deflector 1j according to the seventh embodiment of the present disclosure.

Figure 15:
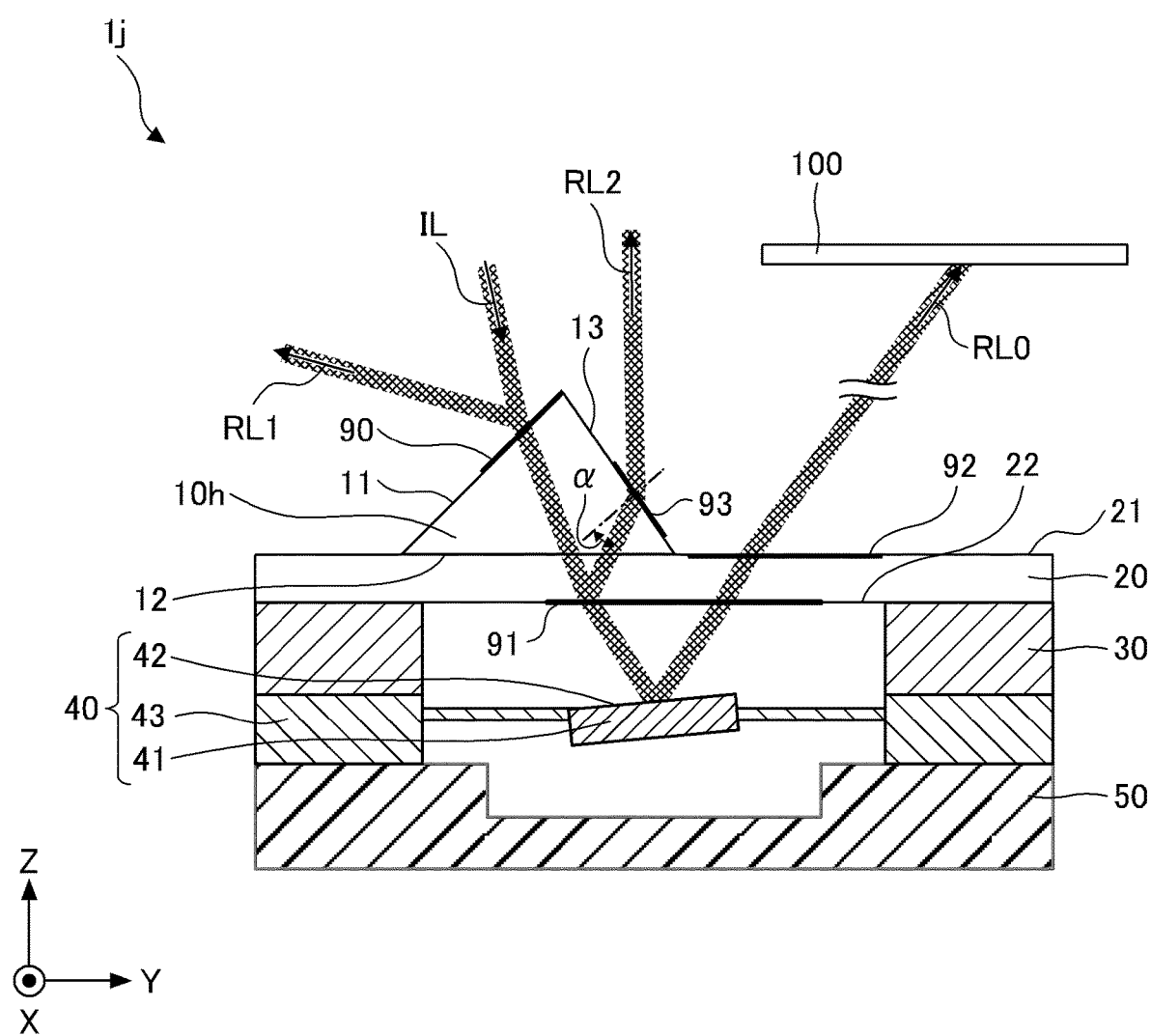
FIG. 15 is a A-A' sectional view of FIG. 14.

FIG. 15 is a A-A' sectional view of FIG. 14.

Figure 16:
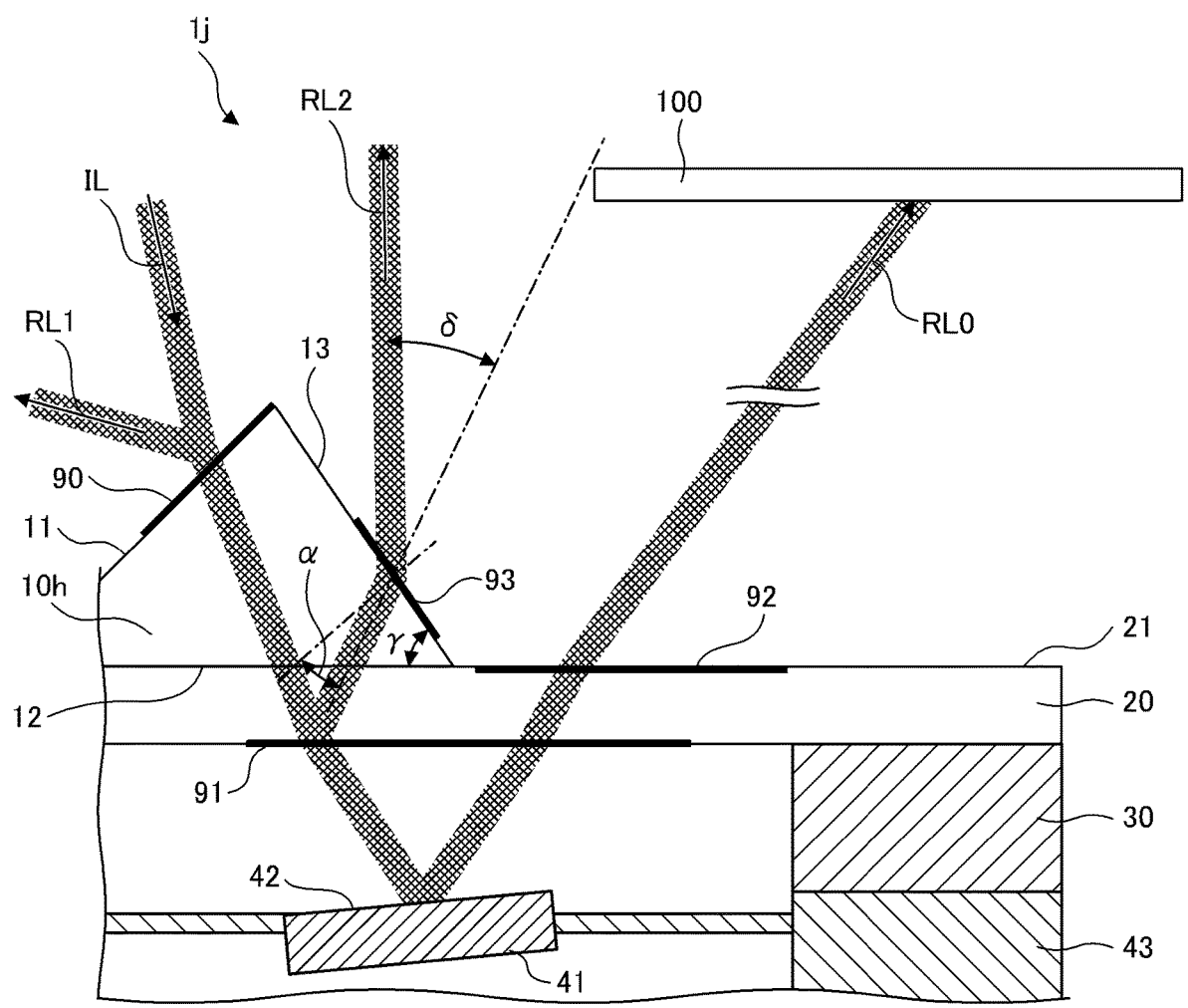
FIG. 16 is a magnified view of a relevant part of the light deflector of FIG. 14.

FIG. 16 is a magnified view of a relevant part of the light deflector of FIG. 141j.

The light deflector 1j according to the seventh embodiment has a configuration similar to that of the light deflector 1 according to the first embodiment, except that some of the configuration of the light-beam adjuster is different.

Note that like reference signs are given to elements similar to those described in the first embodiment, and their detailed description is omitted.

Although the light-beam adjuster 10h is shaped like a triangular pole, the light-beam adjuster 10h is different from the light-beam adjuster 10 according to the first embodiment in a point that the light-beam adjuster 10h is configured such that the third plane 13 does not totally reflect the unnecessary reflection light RL2 but deflects and transmits the unnecessary reflection light RL2 so as to change the path to a different direction. More specifically, the third plane 13 is formed so as to satisfy a first equation given below that is a conditional expression to be satisfied to change the path of the unnecessary reflection light RL2 that is incident on the third plane 13 to a direction other than the direction towards the screen 100.

$$\sin^{-1}\frac{n_1}{n_2} \times \sin\alpha - \gamma + \delta > 0°\qquad\text{First Equation}$$

In this equation, "$n_1$'" denotes a refractive index inside the light-beam adjuster 10h." $n_2$" denotes a refractive index of the airspace.

"$\alpha$" denotes the angle that the unnecessary reflection light RL2 forms with the normal line of the third plane 13. "$\gamma$" denotes the angle that the second plane 12 forms with the third plane 13. "$\delta$" denotes the angle that the unnecessary reflection light RL2 that exits from the third plane 13 forms with an edge of the screen 100.

For example, when $n_1=1.5$ (refractive index of glass), $n_2=1$, $\alpha=30°$, and $\delta=15°$, the range of the angle $\gamma$ that satisfies the above first equation is as follows.

$\gamma<63.6°$

In the present embodiment, the third plane 13 of the light-beam adjuster 10h is positioned between the optical path of the incident light IL that is incident on the movable mirror unit 41 and the optical path of the reflection light RL0 that is reflected by the movable mirror unit 41.

In the present embodiment, the fourth antireflection layer 93 is formed on some of or the entirety of the third plane 13 so as to include the area 62 on the third plane 13 through which the unnecessary reflection light RL2 passes.

Once the incident light IL is incident on the first plane 11 of the light-beam adjuster 10h in the light deflector 1j as configured above, the incident light IL passes through the light-beam adjuster 10h and the transparent member 20 and is incident on the movable mirror unit 41. Once the incident light IL is reflected by the reflection plane 42 of the movable mirror unit 41, the incident light IL passes through the transparent member 20 again as the reflection light RL0, and is projected onto the screen 100. In such cases, the reflection light RL0 does not pass through the light-beam adjuster 10h.

In the light deflector 1j according to the present embodiment, the unnecessary reflection light RL1 that occurs on the first plane 11 of the light-beam adjuster 10h is guided to an area outside the screen 100 in its entirety. The unnecessary reflection light RL2 that occurs on the transparent member 20 is deflected on the third plane 13 of the light-beam adjuster 10h and the direction of travel is changed. Accordingly, the unnecessary reflection light RL2 is guided to an area outside the screen 100. As a result, an image with a small amount of noise can be obtained.

A method of manufacturing the light deflector 1 according to the first embodiment of the present disclosure is described below.

FIG. 17A, FIG. 17B, FIG. 17C, and FIG. 17D are diagrams each illustrating the manufacturing processes of the light deflector 1 according to the first embodiment of the present disclosure.

Figure 17A:
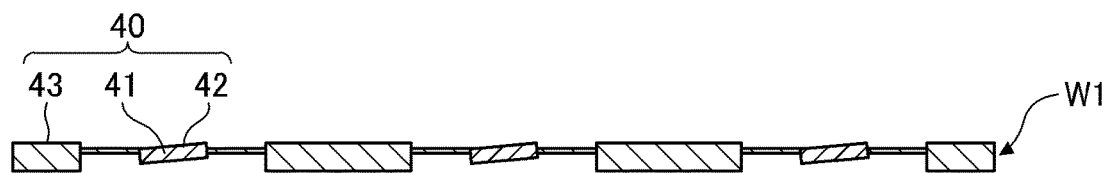
FIG. 17A, FIG. 17B, FIG. 17C, and FIG. 17D are diagrams each illustrating the manufacturing processes of the light deflector according to the first embodiment.
Figure 17B:
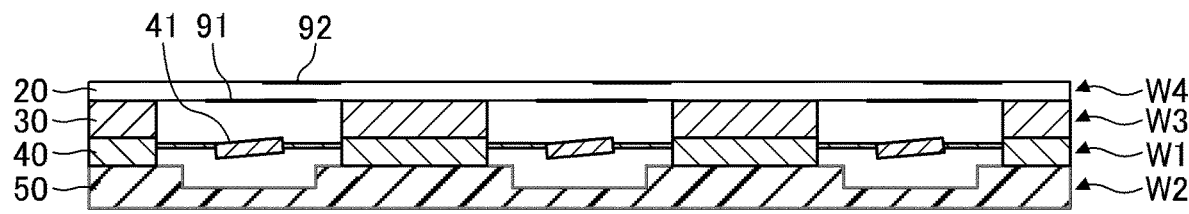

Firstly, in the first processing step as illustrated in FIG. 17A, a first wafer W1 on which a plurality of movable-mirror deflection elements 40 are formed is manufactured by processing a wafer. Next, in the second processing step as illustrated in FIG. 17B, the first wafer W1 is sandwiched and bonded between a second wafer W2 on which a plurality of base unit 50 are formed and a third wafer W3 on which a plurality of spacers 30 are formed. Furthermore, a fourth wafer W4 on which a plurality of transparent members 20 are formed is bonded on the third wafer W3. In the second processing step, the first to fourth wafers W1 to W4 are bonded together after positioning of the movable-mirror deflection element 40, the base unit 50, the spacer 30, and the transparent member 20 at predetermined positions is done. As described above, the first to fourth wafers W1 to W4 are stacked on top of each other and a wafer layered product in which the multiple movable mirror units 41 are packaged is manufactured.

Figure 17C:
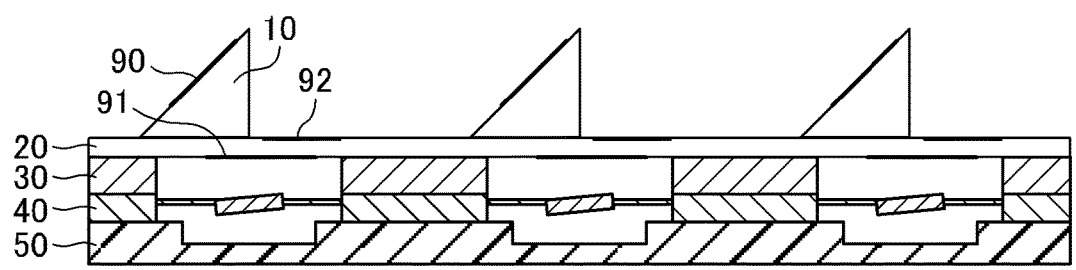
Figure 17D:
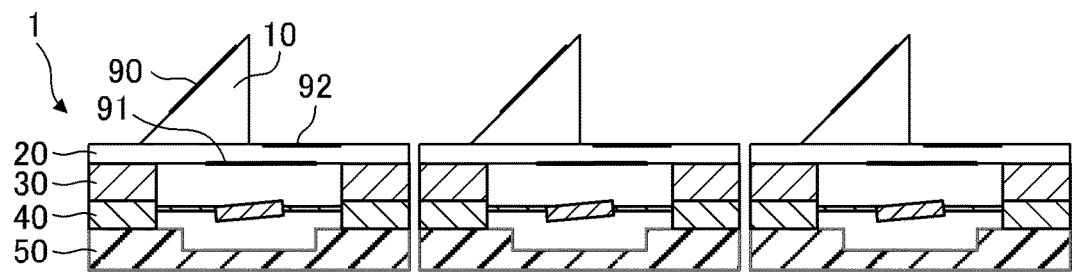

Next, in the third processing step as illustrated in FIG. 17C, a plurality of light-beam adjusters 10 that are polyhedrons are disposed and bonded on the wafer layered product, i.e., on the fourth wafer W4 such that one light-beam adjuster 10 and one movable mirror unit 41 will be a pair. Then, in the fourth processing step as illustrated in FIG. 17D, the wafer layered product is cut for each area in which the light deflector 1 is formed. Accordingly, the multiple light deflectors 1 are collectively manufactured at a wafer level.

The same goes for the other methods of manufacturing a light deflector according to the other embodiments of the present disclosure ad described above.

An optical scanning system to which the light deflector according to the above embodiments of the present disclosure can be applied is described below with reference to FIG. 18 to FIG. 21.

Figure 18:
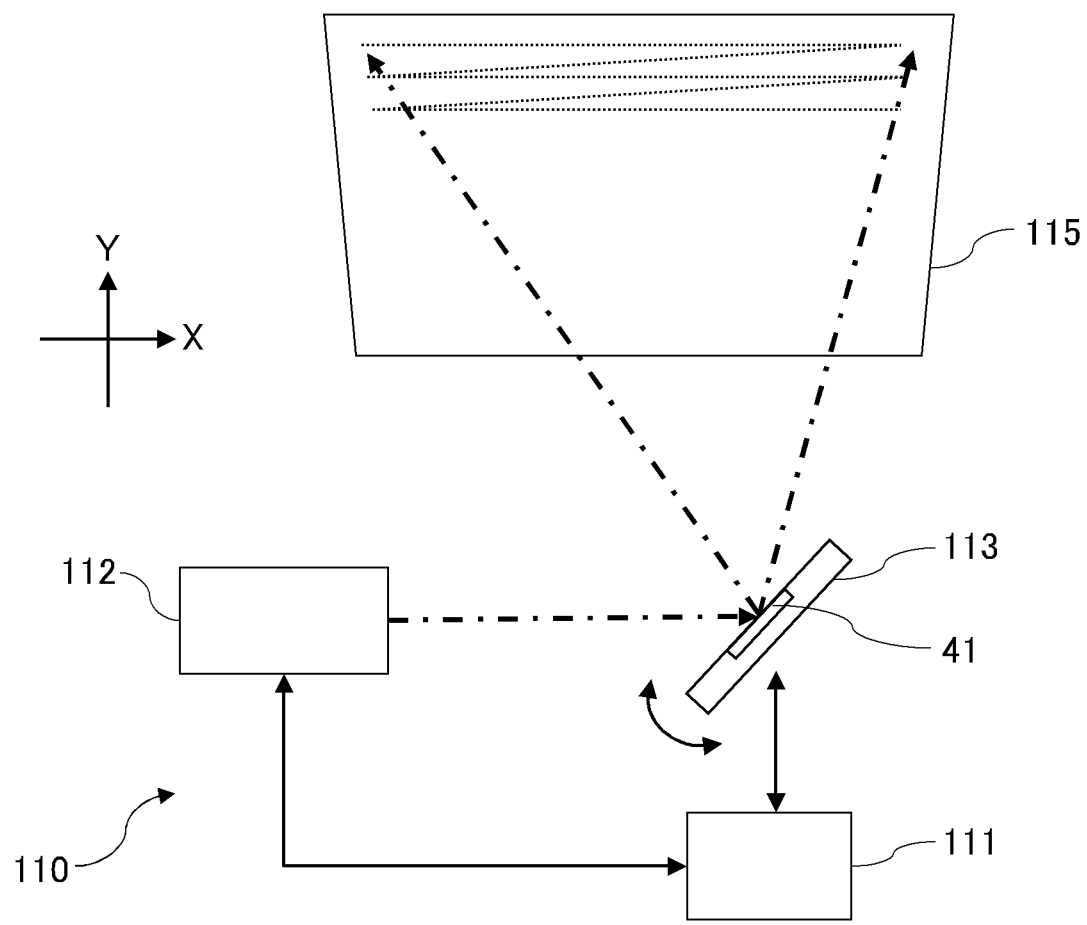
FIG. 18 is a schematic diagram illustrating an optical scanning system according to an embodiment of the present disclosure.

FIG. 18 is a schematic diagram illustrating an optical scanning system 110 according to an embodiment of the present disclosure.

The optical scanning system 110 includes the controller 111, the light-source device 112, and the light deflector 113 that serves as a movable device. The light deflector 113 is a light deflector according to any one of the above embodiments of the present disclosure, and includes the movable mirror unit 41.

The optical scanning system 110 deflects the light emitted from the light-source device 112 in accordance with the control made by the controller 111, with the movable mirror unit 41 of the light deflector 113, so as to optically scan the target surface 115.

For example, the controller 111 is an electronic circuit unit provided with a central processing unit (CPU) and a field-programmable gate array (FPGA). The light deflector 113 is a micro-electromechanical systems (MEMS) device that can rotate the movable mirror unit 41. For example, the light-source device 112 is a laser diode (LD). For example, the target surface 115 is the screen 100 as above.

The controller 111 generates a control instruction to control the light-source device 112 and the light deflector 113 based on the optical scanning information obtained from an external device. The controller 111 outputs a driving signal to the light-source device 112 and the light deflector 113 based on the generated control instruction.

The light-source device 112 emits laser beams to the light deflector 113 based on the received driving signal. The light deflector 113 drives the movable mirror unit 41 at least in a uniaxial direction or biaxial direction, based on the received driving signal.

For example, in the control performed by the controller 111 that uses image data as the optical scanning information, the controller 111 causes the movable mirror unit 41 to move back and forth within a predetermined range in a biaxial manner. Due to this configuration, the light (i.e., the above incident light IL) that is incident on the movable mirror unit 41 is deflected around a certain single axis and is optically scanned, and an image that is based on the image data is projected onto the target surface 115.

A hardware configuration of the controller 111 is described below.

Figure 19:
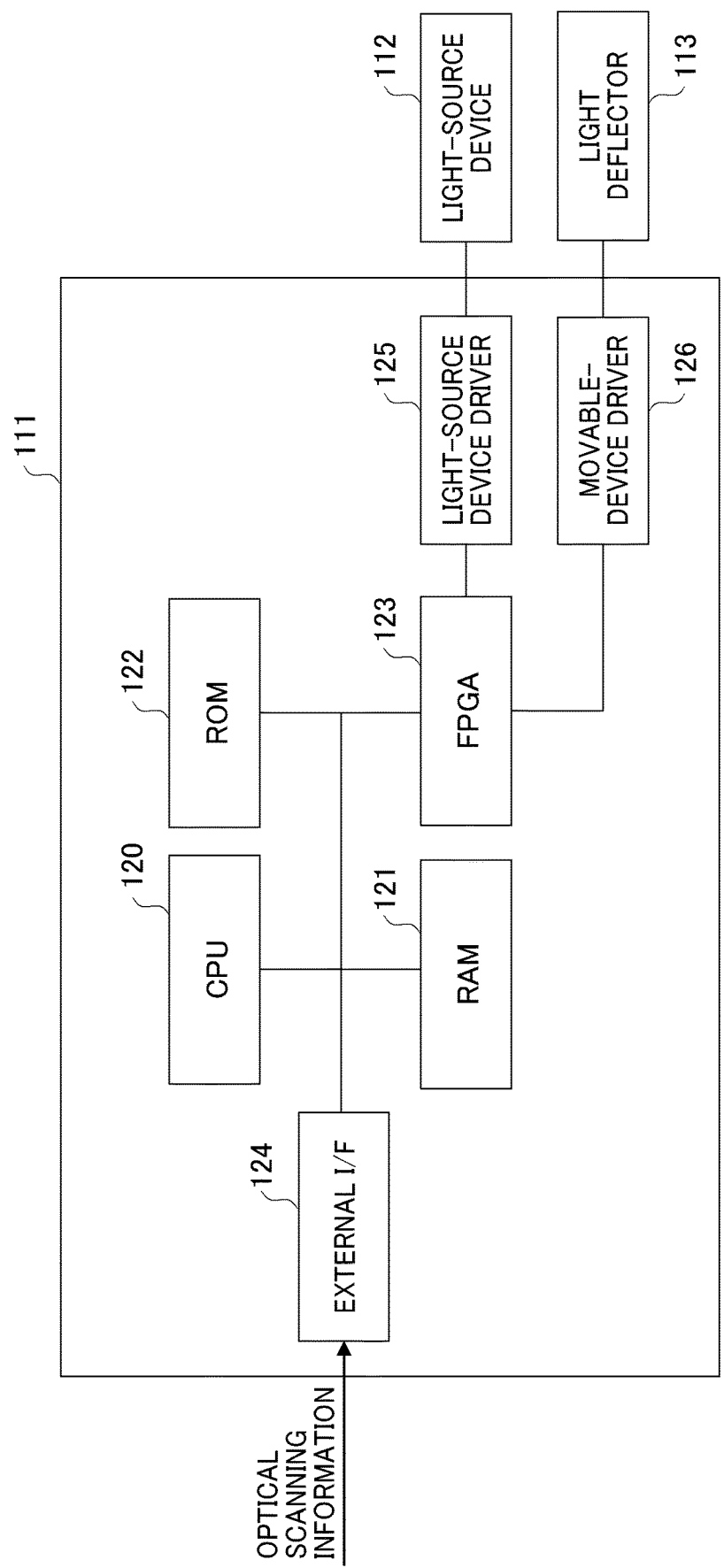
FIG. 19 is a block diagram illustrating a hardware configuration of a controller according to an embodiment of the present disclosure.

FIG. 19 is a block diagram illustrating a hardware configuration of the controller 111, according to an embodiment of the present disclosure.

The controller 111 includes the CPU 120, a random access memory (RAM) 121, a read only memory (ROM) 122, the FPGA 123, an external interface (I/F) 124, an light-source device driver 125, and a movable-device driver 126.

The CPU 120 loads into the RAM 121 a program or data from a storage device such as the ROM 122 and performs processes. Accordingly, the controls or functions of the entirety of the controller 111 are implemented.

The RAM 121 is a volatile storage device that temporarily stores data or a computer program. The ROM 122 is a read-only nonvolatile storage device that can store a computer program or data even when the power is switched off, and stores, for example, data or a processing program that is executed by the CPU 120 to control the multiple functions of the optical scanning system 110.

The FPGA 123 is a circuit that outputs a control signal to the light-source device driver 125 and the movable-device driver 126 according to the processes performed by the CPU 120.

For example, the external interface 124 is an interface with an external device or the network. For example, the external device may be a host device such as a personal computer (PC) and a storage device such as a universal serial bus (USB) memory, a secure digital (SD) card, a compact disc (CD), a digital versatile disc (DVD), a hard disk drive (HDD), and a solid state drive (SSD). For example, the network includes a controller area network (CAN) of a vehicle, a local area network (LAN), and the Internet. The external interface 124 is satisfactory as long as it has a configuration by which connection to an external device or communication with an external device is achieved. The external interface 124 may be provided for each external device.

The light-source driver 125 is an electric circuit that outputs a driving signal such as a driving voltage to the light source 112 in accordance with the received control signal.

The movable-device driver 126 is an electric circuit that outputs a driving signal such as a driving voltage to the light deflector 113, which serves as a movable device, in accordance with the received control signal.

The CPU 120 acquires the optical scanning information from an external device or a network through the external interface 124. The configuration of the controller 111 is satisfactory as long as the CPU 120 can obtain the optical scanning information. The optical scanning information may be stored in the ROM 122 or in the FPGA 123 in the controller 111. Alternatively, a storage device such as an solid state disk (SSD) may be newly provided in the controller 111 and the optical scanning information may be stored in the storage device.

The optical scanning information in the present embodiment is information about the way of optical scanning to be performed on the target surface 115. For example, the optical scanning information is image data in a case where an image is to be displayed by optical scanning, and the optical scanning information is writing data indicating the order and portion of writing in a case where optical writing is to be performed by optical scanning. Furthermore, for example, the optical scanning information is irradiation data indicating the timing and range of irradiation of light for object recognition in a case where an object is to be recognized by optical scanning.

A functional configuration of the controller 111 is described below.

Figure 20:
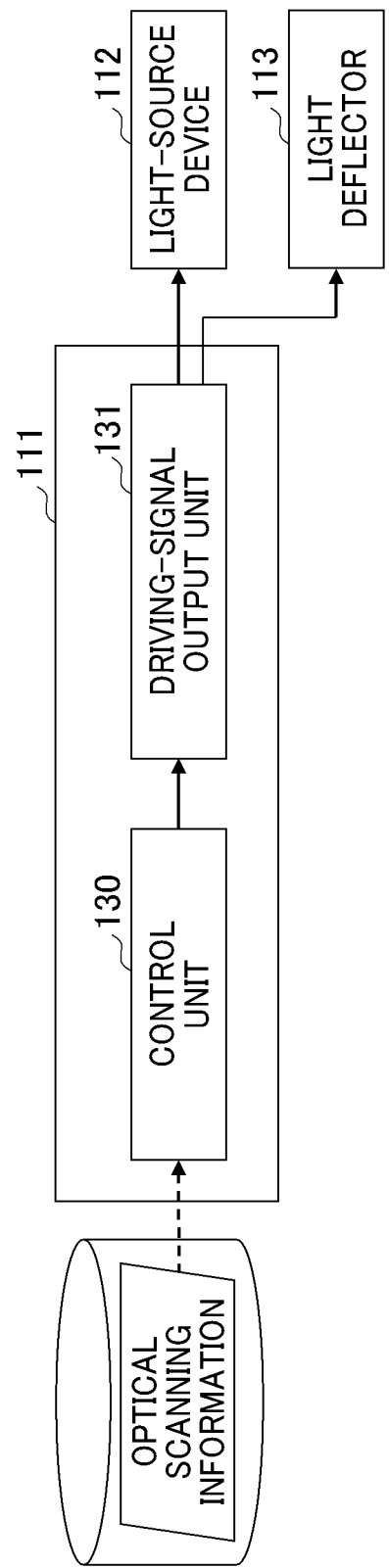
FIG. 20 is a diagram illustrating a functional configuration of a controller according to an embodiment of the present disclosure.

FIG. 20 is a diagram illustrating a functional configuration of the controller 111 according to the present embodiment.

In the controller 111, the functionality of a control unit 130 and a driving-signal output unit 131 is implemented by a hardware configuration as illustrated in FIG. 19 and instructions given from, for example, the CPU 120. The control unit 130 is implemented by, for example, the CPU 120 and the FPGA 123. The control unit 130 obtains optical scanning information from an external device, and converts the obtained optical scanning information into a control signal and outputs the obtained control signal to the driving-signal output unit 131. For example, the controller unit 130 acquires image data from an external device or the like as the optical scanning information, generates a control signal from the image data through predetermined processing, and outputs the control signal to the drive-signal output unit 131.

For example, the driving-signal output unit 131 is implemented by the light-source driver 125 and the movable-device driver 126, and outputs a driving signal to the light-source device 112 or the light deflector 113 based on the received control signal.

For example, the driving signal that is output to the light-source device 112 is a driving voltage used to control the irradiation intensity and the timing at which light is emitted by the light-source device 112. For example, the driving signal that is output to the light deflector 113 is a driving voltage used to control the range of motion of the movable mirror unit 41 and the timing at which the movable mirror unit 41 is driven.

The optical scanning processes that are performed by the optical scanning system 110 are described below.

Figure 21:
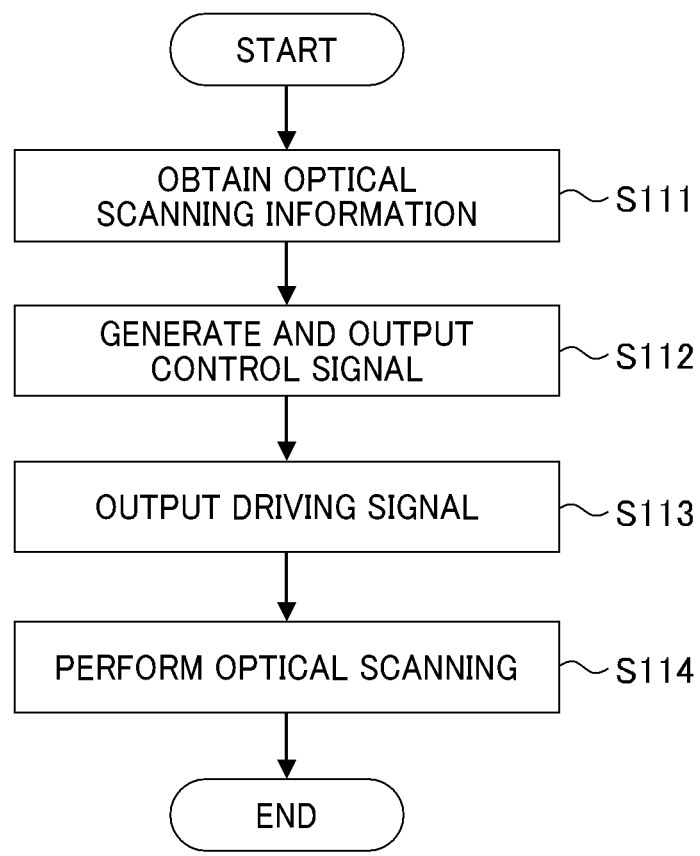
FIG. 21 is a flowchart of optical scanning processes according to an embodiment of the present disclosure.

FIG. 21 is a flowchart of such optical scanning processes according to the present embodiment.

Firstly, the control unit 130 obtains optical scanning information from, for example, an external device (step S111). The control unit 130 generates a control signal from the obtained optical scanning information, and outputs the generated control signal to the driving-signal output unit 131 (step S112). The driving-signal output unit 131 outputs a driving signal to each of the light-source device 112 and the light deflector 113, based on the received control signal (step S113). Then, the light-source device 112 emits light based on the received driving signal. Moreover, the light deflector 113 drives the movable mirror unit 41 based on the received driving signal. The light is deflected by the operation of the light-source device 112 and the light deflector 113, and optically scanning is performed (step S114).

In the optical scanning system 110 as described above, a single controller 111 includes a device and function used to control the light-source device 112 and the light deflector 113. However, a controller for the light-source device and a controller for the movable-device may separately be provided.

In the optical scanning system 110 as described above, the two functions of the control unit 130 and the driving-signal output unit 131 are implemented by a single controller 111. However, no limitation is indicated thereby, and these two functions may independently be implemented by two different devices. For example, a drive-signal output device may separately provided to implement the drive-signal output unit 131 in addition to the controller that implements the control unit 130.

An optical deflection system that performs optical deflection may be configured by the light deflector 113 and the controller 111 of the above optical scanning system 110.

An example case in which the optical scanning system is applied to an image projector is described below. The image projector is an apparatus that projects an image by performing optically scanning. The image projector is, for example, a heads-up display (HUD) device.

Figure 22:
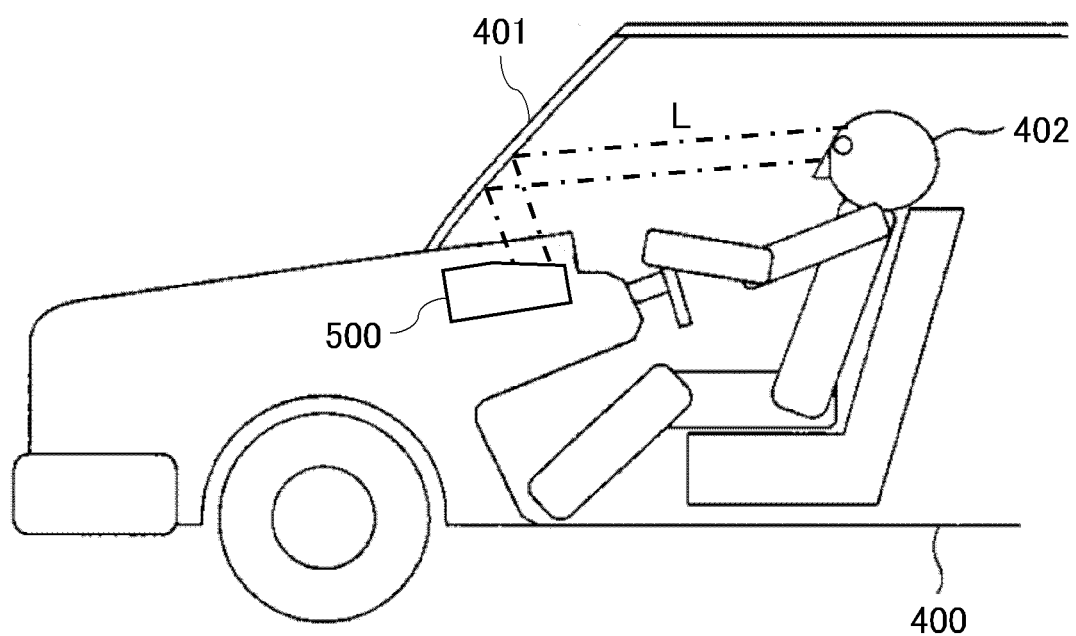
FIG. 22 is a schematic diagram illustrating a vehicle provided with a heads-up display according to an embodiment of the present disclosure.

FIG. 22 is a is a schematic view of a vehicle 400 provided with a heads-up display (HUD) 500, according to an embodiment of the present disclosure.

Figure 23:
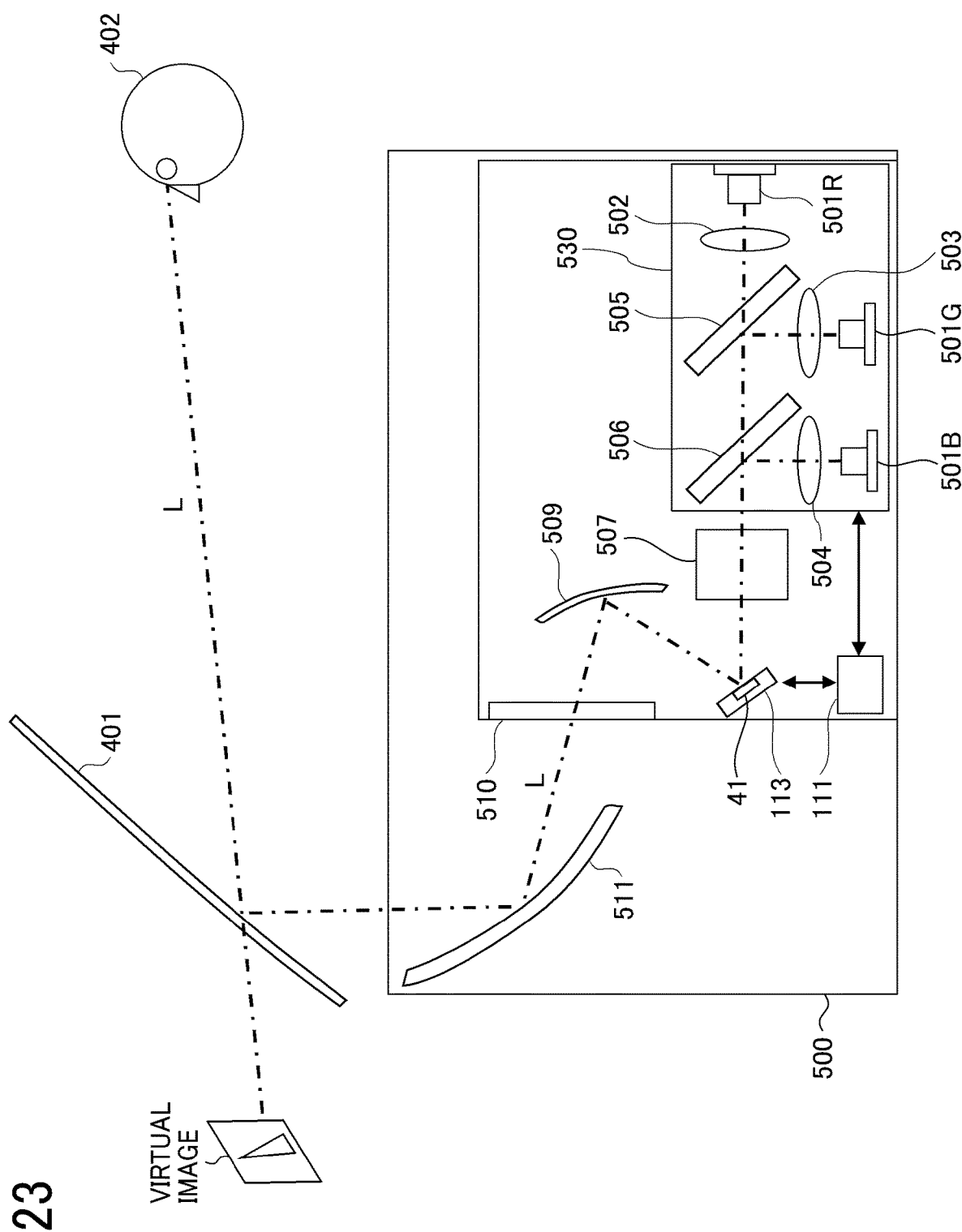
FIG. 23 is a diagram illustrating a configuration of a heads-up display according to an embodiment of the present disclosure.

FIG. 23 is a diagram illustrating a configuration of the HUD 500 according to the present embodiment.

As illustrated in FIG. 22, for example, the HUD 500 is disposed near a front windshield such as a front windshield 401 of the vehicle 400. The projection light L that is emitted from the HUD 500 is reflected by the front windshield 401, and heads towards a viewer (i.e., a driver 402) who is the user. Accordingly, the driver 402 can visually recognize an image or the like projected by the HUD 500 as a virtual image. Note that a combiner may be disposed on the inner wall of the front windshield, and the user may visually recognize a virtual image formed by the projection light L that is reflected by the combiner.

As illustrated in FIG. 23, the HUD 500 emits laser beams of three colors from red, green, and blue laser beam sources 501R, 501G, and 501B, respectively. The emitted multiple laser beams pass through an incident optical system composed of collimator lenses 502, 503, and 504 that are provided for the laser beam sources 501R, 501G, and 501B, respectively, two dichroic mirrors 505 and 506, and a light-intensity adjustor 507, and are incident on the light deflector 113. The laser beams that are deflected by the light deflector 113 pass through a projection optical system composed of a free-form surface mirror 509, an intermediate screen 510, and a projection mirror 511, and are projected onto a screen.

In the HUD 500, the laser beam sources 501R, 501G, and 501B, the collimator lenses 502, 503, and 504, and the dichroic mirrors 505 and 506 are unitized as a light source unit 530 in an optical housing.

The HUD 500 projects an intermediate image that is displayed on the intermediate screen 510, on the front windshield 401 of the vehicle 400, thereby allowing the driver 402 to visually recognize the intermediate image as a virtual image.

The laser beams of the respective colors emitted from the laser beam sources 501R, 501G, and 501B are approximately collimated by the collimator lenses 502, 503, and 504 and are combined by the two dichroic mirrors 505 and 506. The light intensity of the combined laser beams is adjusted by the light-intensity adjustor 507, and then the adjusted laser beams are two-dimensionally scanned by the light deflector 113.

The projection light L that has been two-dimensionally scanned by the light deflector 113 is reflected by the free-form surface mirror 509 so as to correct the distortion, and then is concentrated onto the intermediate screen 510. Accordingly, an intermediate image is displayed. The intermediate screen 510 is constituted by a microlens array in which a plurality of microlenses are two-dimensionally arranged, and expands the projected light L incident on the intermediate screen 510 in units of microlens.

The light deflector 113 moves the movable mirror unit 41 biaxially in a reciprocating manner to perform two-dimensional scanning by using the projected light L incident on the movable mirror unit 41. The driving of the light deflector 113 is controlled in synchronization with the light-emitting timing of the laser beam sources 501R, 501G, and 501B.

In the above description, the HUD 500 is described as an example of the image projection apparatus. However, no limitation is indicated thereby, and the image projection apparatus may be any apparatus that performs optical scanning, using the light deflector 113, to project an image. For example, the image projection apparatus may be a projector or a head-mounted display. For example, the projector is placed on a desk, and projects an image on a display screen. The head-mounted display is incorporated in a wearable member on the head of the observer, and projects an image on a reflective-and-transmissive screen of the wearable member or on an eye ball as a screen.

The image projection apparatus may be incorporated in, not only a vehicle such as a car or the wearable member, but also, for example, a mobile object such as an aircraft, a ship, or an autonomous mobile robot, and an immobile object such as an operation robot that operates a driving target such as a manipulator without moving from the installed location.

An example case in which the optical scanning system is applied to a laser headlamp device is described below. The laser headlamp device may be provided for the headlights of a car.

Figure 24:
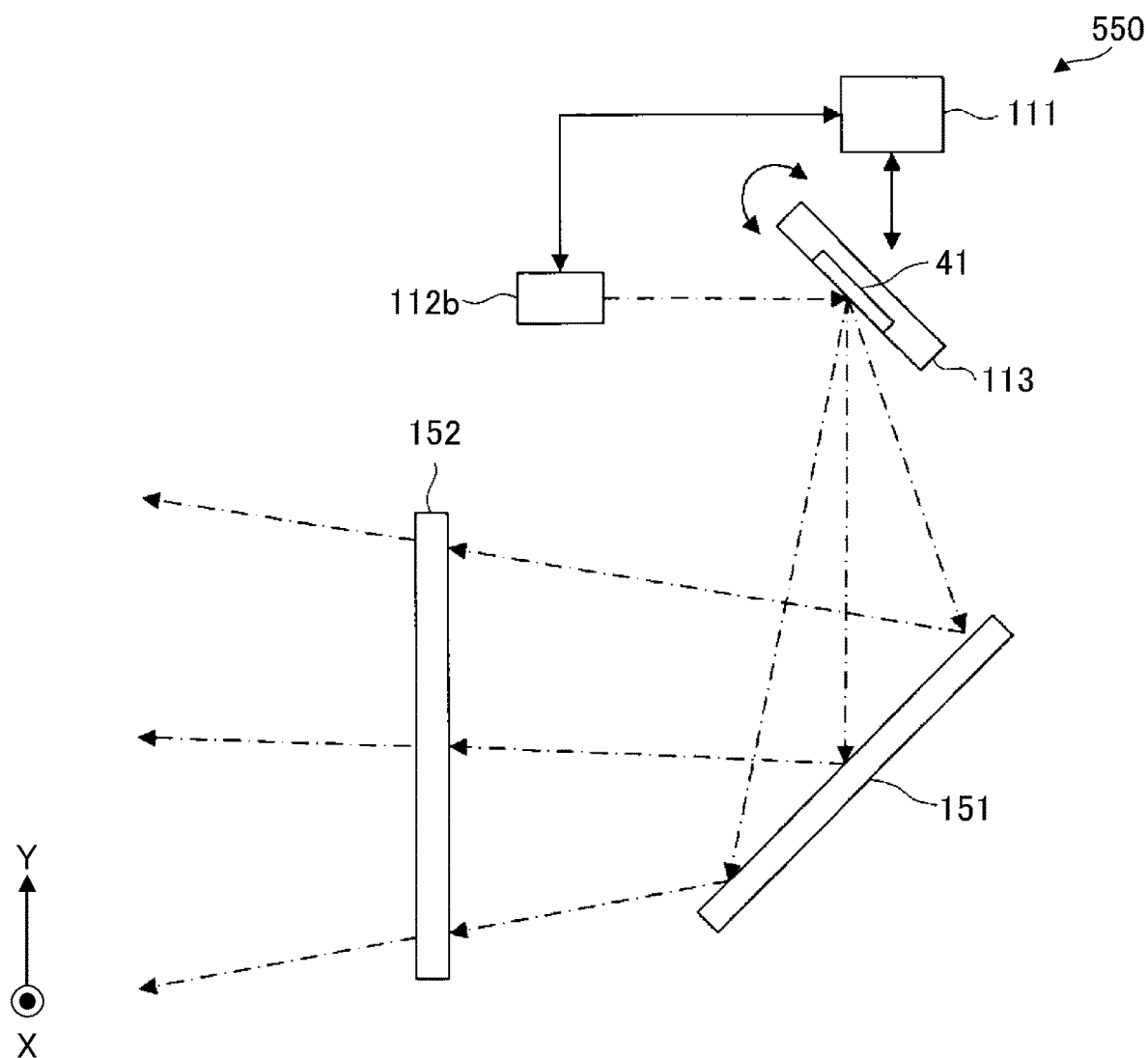
FIG. 24 is a diagram illustrating a configuration of a laser headlamp device according to an embodiment of the present disclosure.

FIG. 24 is a diagram illustrating a configuration of a laser headlamp device 550 according to an embodiment of the present disclosure.

The laser headlamp device 550 includes a controller 111, a light-source device 112*b*, a light deflector 113, a mirror 151, and a transparent plate 152. The light-source device 112*b* is a light source that emits blue laser beams. The laser beams that are emitted from the light-source device 112*b* are incident on the light deflector 113, and are reflected by the movable mirror unit 41. The light deflector 113 drives the movable mirror unit 41 in the XY-direction based on a signal sent from the controller 111, and two-dimensionally scans the blue laser beams that are emitted from the light-source device 112 in the XY-direction.

The scanning light of the light deflector 113 is reflected by the mirror 151, and is incident on the transparent plate 152. The transparent plate 152 is coated with a fluorescent material whose surface or back side is in yellow. The blue laser beams that are reflected by the mirror 151 is converted into white light that serves as the light of a headlight as passing through the fluorescent material of the transparent plate 152. Accordingly, the area ahead of the car is illuminated with the white illumination light that has passed through the transparent plate 152.

The scanning light of the light deflector 113 scatters as passing through the fluorescent material of the transparent plate 152. Due to this configuration, glare is attenuated at an illuminated target in the area ahead of the car.

The color of the laser beams that are emitted from the light-source device 112*b* is not limited to blue, and the color of the fluorescent material that covers the transparent plate 152 is not limited to yellow. For example, the laser beams that are emitted from the light-source device 112*b* may be near-ultraviolet light, and the transparent plate 152 may be coated with homogenized mixture of a plurality of kinds of fluorescent materials of red-green-blue (RGB) trichromatic colors. Also in such a configuration as above, the light that passes through the transparent plate 152 is converted into white light.

An example case in which the optical scanning system is applied to an image forming apparatus is described below. The image forming apparatus forms an image on a recording medium using an optical writing device. By way of example, the image forming apparatus may be a laser printer that performs printing operation using laser beams.

Figure 25:
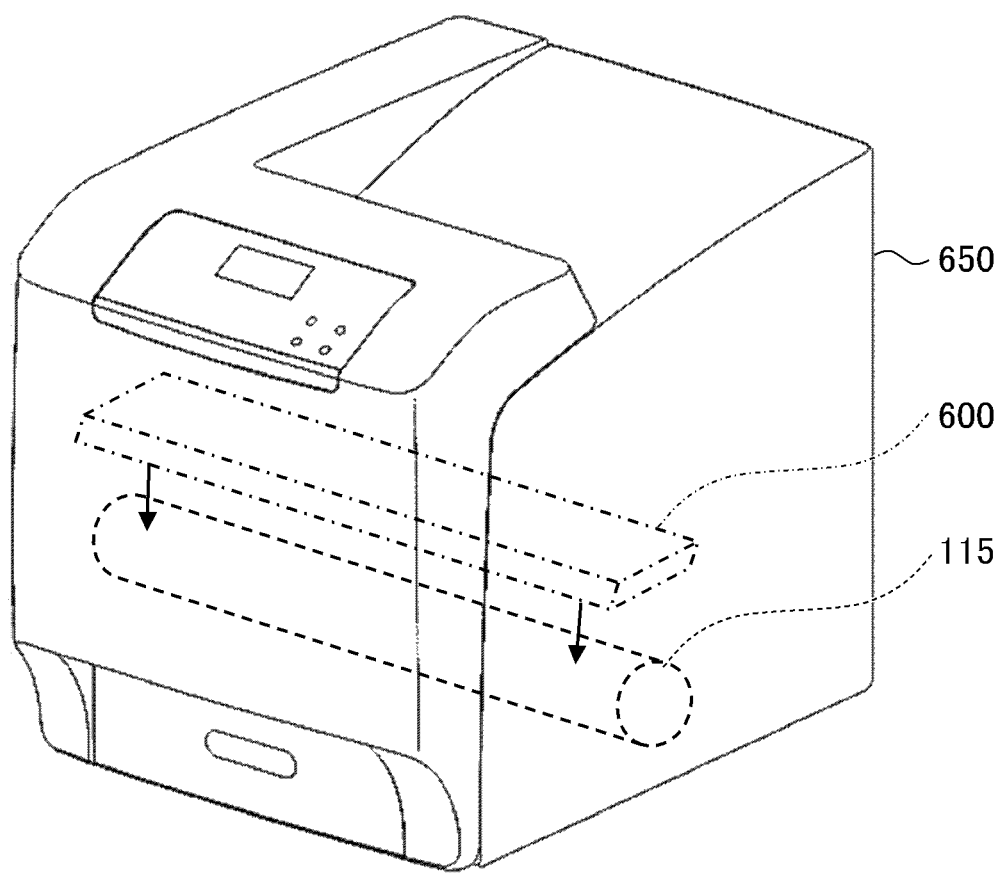
FIG. 25 is a schematic diagram of a laser printer incorporating an optical writing device, according to an embodiment of the present disclosure.

FIG. 25 is a schematic diagram of a laser printer 650 incorporating an optical writing device 600, according to an embodiment of the present disclosure.

Figure 26:
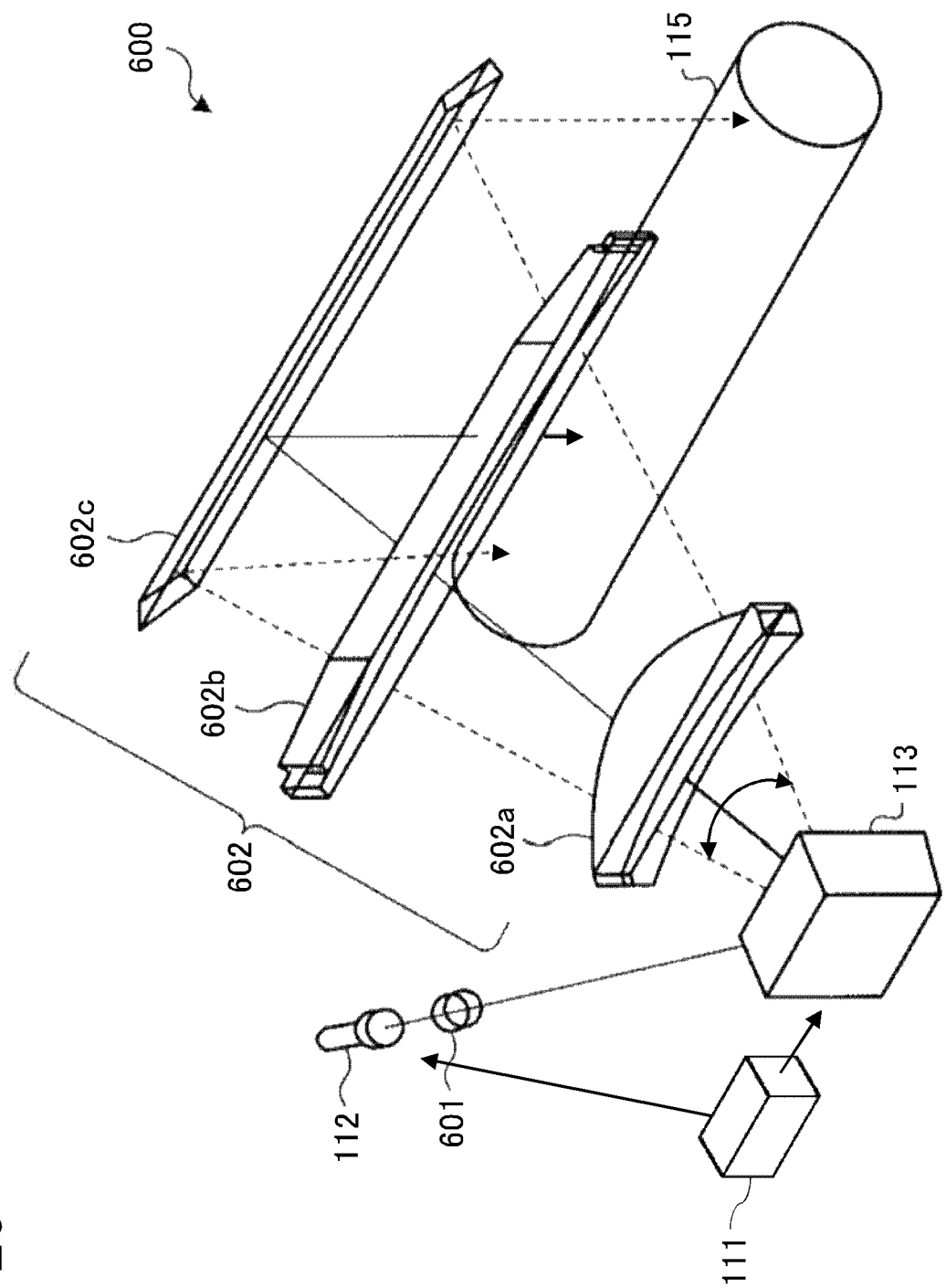
FIG. 26 is a diagram illustrating a configuration of an optical writing device, according to an embodiment of the present disclosure.

FIG. 26 is a diagram illustrating a configuration of the optical writing device 600 that is used as a component of the laser printer 650 or the like, according to an embodiment of the present disclosure.

As illustrated in FIG. 25, the optical writing device 600 is incorporated into the laser printer 650, and performs optical scanning on a photoconductor drum, which is the target surface 115, by using one or more laser beams, thereby performing optical writing on the photoconductor drum. The target surface 115 is not limited to a photoconductor drum, but may be photosensitive paper.

As illustrated in FIG. 26, in the optical writing device 600, the laser beams that are emitted from the light-source device 112 such as a laser element pass through an imaging optical system 601 such as a collimator lens and are incident on the light deflector 113, and then are deflected uniaxially or biaxially by the light deflector 113.

The laser beams that are deflected by the light deflector 113 pass through a scanning optical system 602 composed of a first lens 602*a*, a second lens 602*b*, and a reflecting mirror unit 602*c*, and are emitted onto the target surface 115 (e.g., a photoconductor drum or photosensitive paper), and thereby optical writing is performed. The scanning optical system 602 forms a laser beam in the form of a spot on the target surface 115. The light-source device 112 and the light deflector 113 are driven based on the control performed by the controller 111.

As described above, the optical writing device 600 can be used as a component of the image forming apparatus. In the optical writing device 600, the scanning optical system may be configured to perform optical scanning both uniaxially and biaxially. Due to such a configuration, the optical writing device 600 can also be used as a component of an image forming apparatus such as a laser labeling device. The laser labeling device is an image forming apparatus that deflects laser beams to perform optical scanning on thermal media and print letters by heating.

The light deflector 113 of the above configuration is advantageous in saving power of the optical writing device because power consumption for driving the light deflector 113 is less than that for driving a polygon mirror or the like. Moreover, the light deflector 113 is advantageous in reducing the noise in the optical writing device. The light deflector 113 requires much smaller footprint than that of a polygon mirror, and the amount of heat generated by the light deflector 113 is small. Accordingly, the light deflector 113 is advantageous in downsizing the image forming apparatus.

An example case in which the optical scanning system is applied to an object recognition device is described below. The object recognition device is an apparatus that recognizes an object in a target direction by performing optically scanning. For example, the object recognition device may be a light detection and ranging (LiDAR) device.

Figure 27:
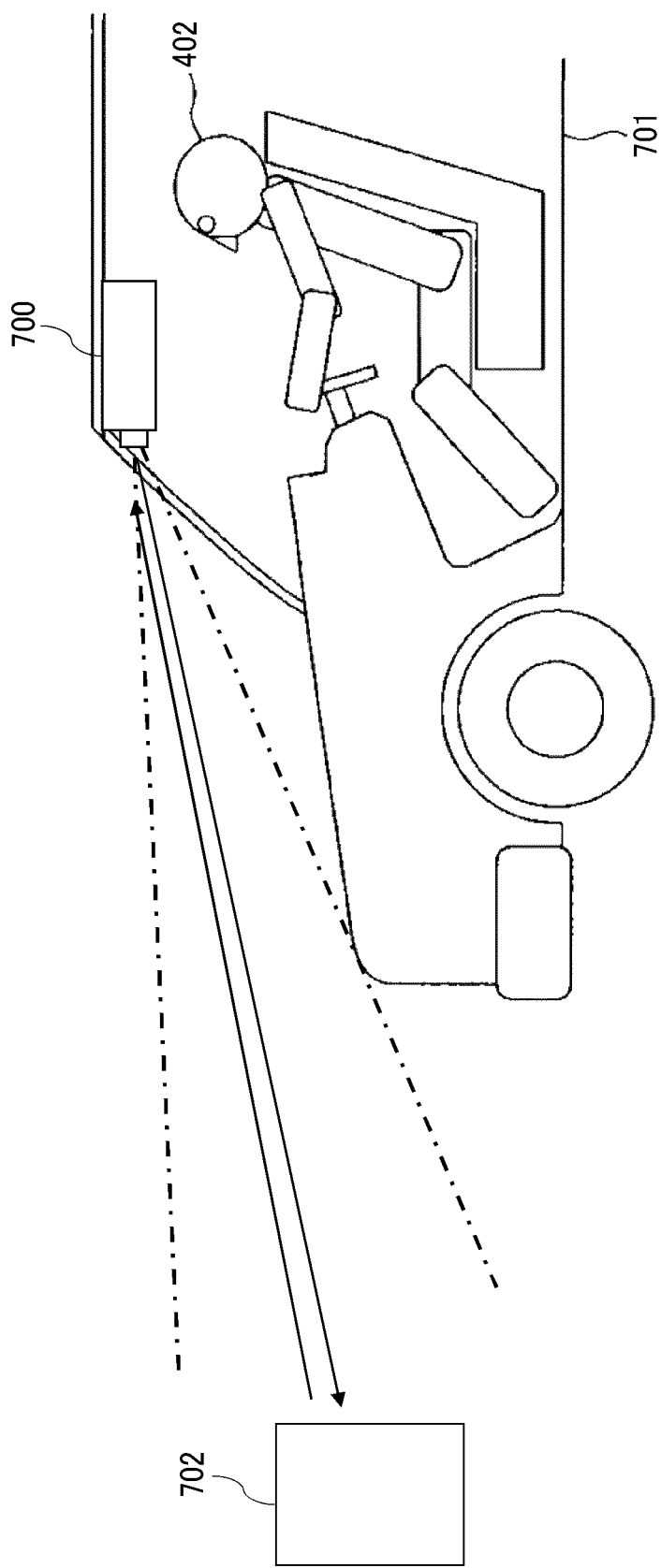
FIG. 27 is a schematic diagram illustrating a vehicle provided with a light detection and ranging (LiDAR) device, according to an embodiment of the present disclosure.

FIG. 27 is a schematic diagram of a car 701 provided with a LiDAR device 700, according to an embodiment of the present disclosure.

Figure 28:
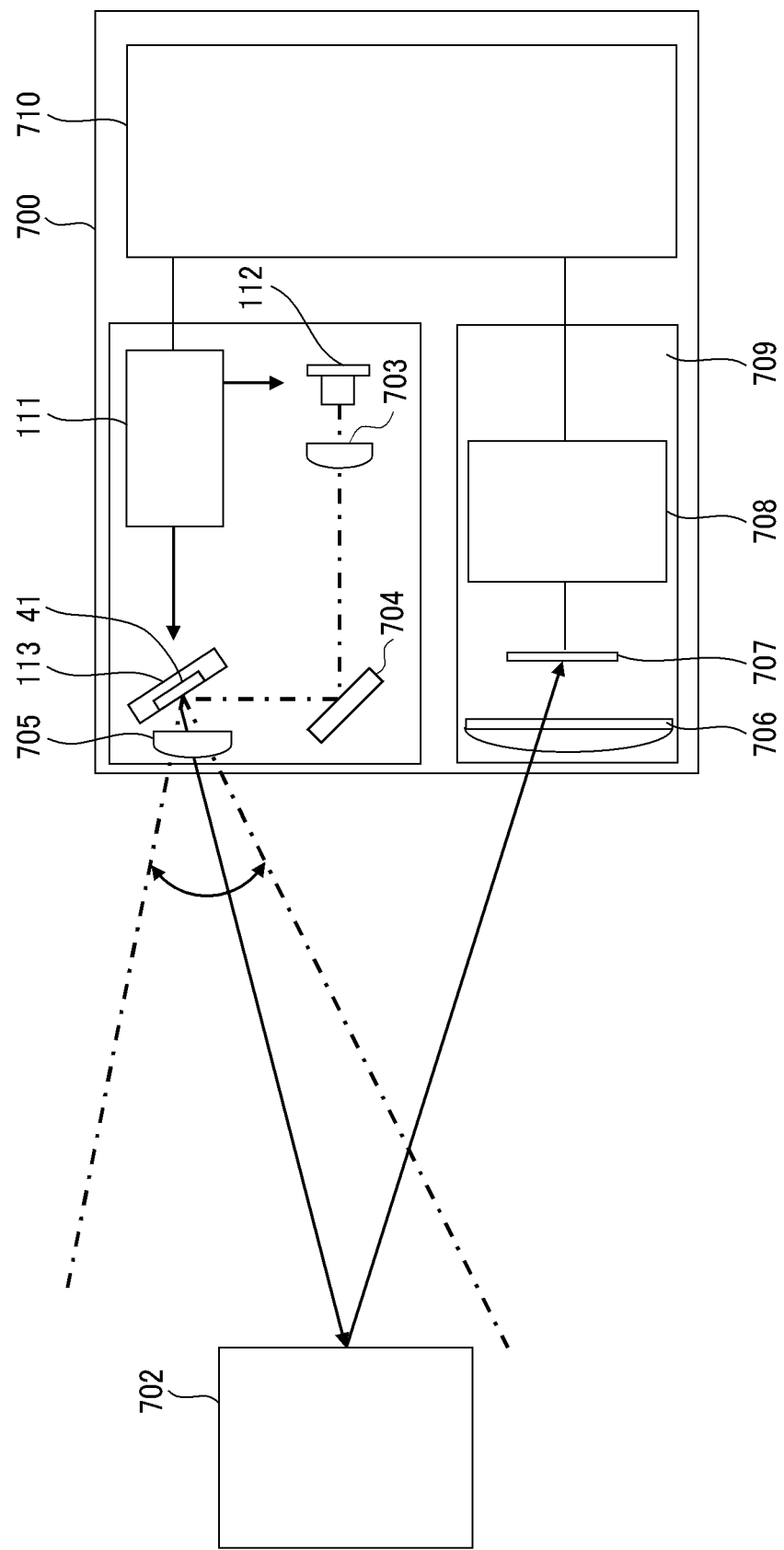
FIG. 28 is a diagram illustrating a configuration of a LiDAR device, according to an embodiment of the present disclosure.

FIG. 28 is a diagram illustrating a configuration of the LiDAR device 700 according to the present embodiment.

As illustrated in FIG. 27, for example, the LiDAR device 700 is provided for the car 701 to perform optical scanning in a target direction and receive the light reflected from an object 702 that exists in the target direction. Accordingly, the object 702 can be recognized by the LiDAR device 700.

As illustrated in FIG. 28, the laser beams that are emitted from the light-source device 112 pass through an incident optical system composed of a collimator lens 703 and a plane mirror 704, and are incident on the light deflector 113. Then, the laser beams are uniaxially or biaxially scanned by the light deflector 113. The collimator lens 703 is an optical system that approximately collimates the diverging light. Further, the laser beams that are emitted from the light deflector 113 are emitted to the object 702 ahead of the apparatus, as passing through, for example, a projection lens 705 that serves as a projection optical system. The light-source device 112 and the light deflector 113 are driven based on the control performed by the controller 111.

The light that is reflected by the object 702 is detected by a photodetector 709. More specifically, the reflected light passes through, for example, a condenser lens 706, and is received by an image sensor 707. Then, the image sensor 707 outputs a detected signal to a signal processing unit 708. The signal processing unit 708 performs predetermined processing on the input detected signal, such as binarization or noise processing, and outputs the result to a distance measuring circuit 710.

The distance measuring circuit 710 determines whether the object 702 is present based on the time difference between the timing at which the light-source device 112 emits laser beam and the timing at which the photodetector 709 receives the laser beam or the phase difference among pixels of the image sensor 707 that receives light Further, the distance measuring circuit 710 calculates the distance information indicating the distance to the object 702 based on the time difference or the phase difference.

The light deflector 113 cannot easily be broken and is compact compared with a polygon mirror, and thus a highly durable and compact LiDAR device 700 can be provided.

Such a LiDAR device is attached not only to a vehicle such as a car but also to a mobile object such as an aircraft, a ship, and a robot, and can perform optical scanning within a predetermined range to determine whether an obstacle is present or to recognize the distance to the obstacle.

In the present embodiment, the LiDAR device 700 is described as an example of the object recognition device. However, no limitation is intended thereby. The object recognition device may be any apparatus that performs optical scanning by controlling the light deflector 113 and that receives the reflected laser beam using a photodetector to recognize the object 702. For example, the object recognition device may be a biometric authentication apparatus and a security sensor. The biometric authentication apparatus performs optical scanning on a hand or face in order to obtain distance information, calculates object information such as the shape of the object based on the distance information, and refers to records to recognize the object. The security sensor performs optical scanning in a target range to recognize an incoming object. Furthermore, the object recognition device may be a three-dimensional scanner that outputs three-dimensional data upon calculating and recognizing, for example, the shape of an object based on the distance data obtained by performing optical scanning.

A configuration of the movable-mirror deflection element 40 included in the light deflector 113 is described below.

Figure 29:
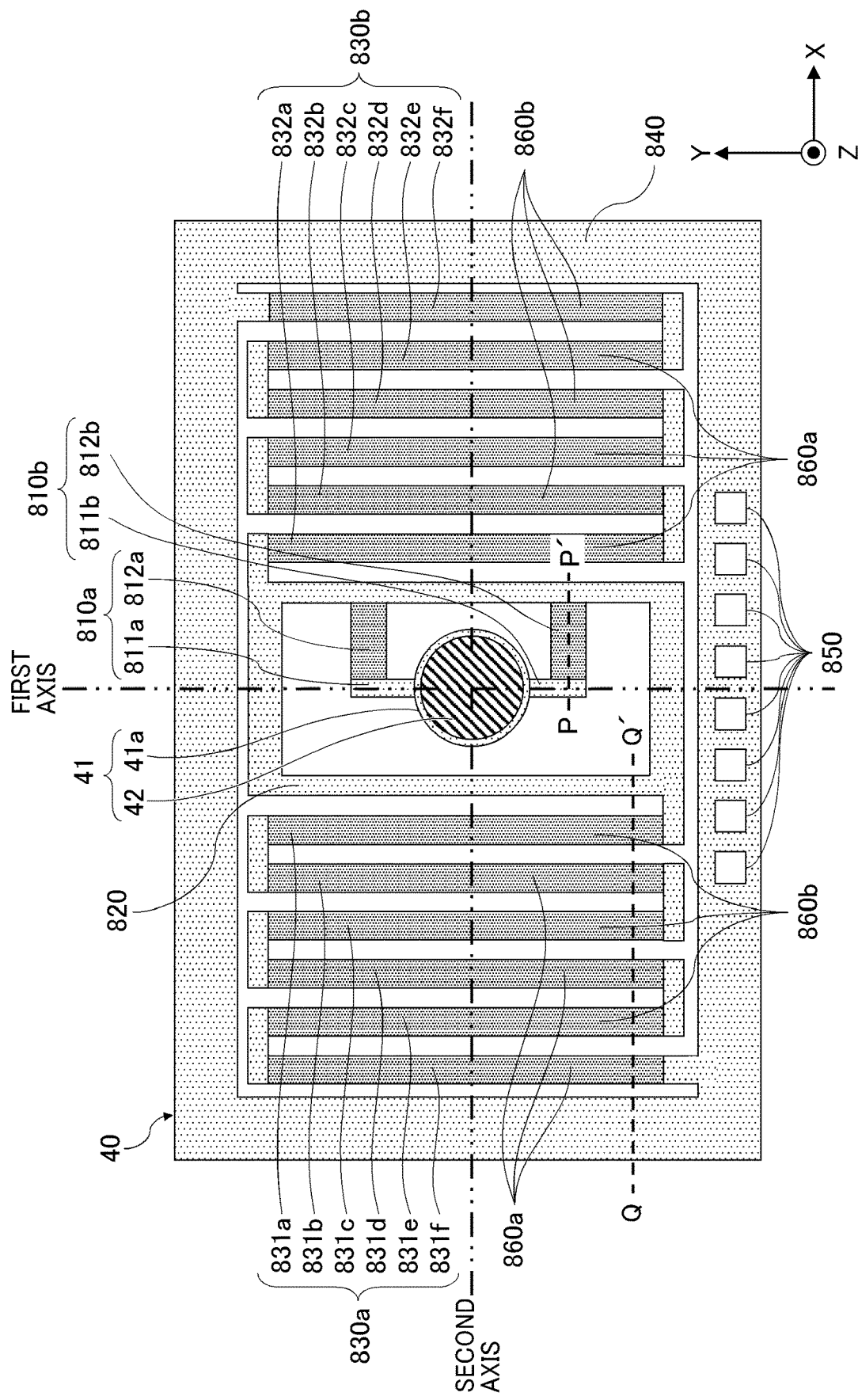
FIG. 29 is a plan view of a movable-mirror deflection element according to an embodiment of the present disclosure.

FIG. 29 is a plan view of a movable-mirror deflection element 40 according to an embodiment of the present disclosure.

Figure 30:
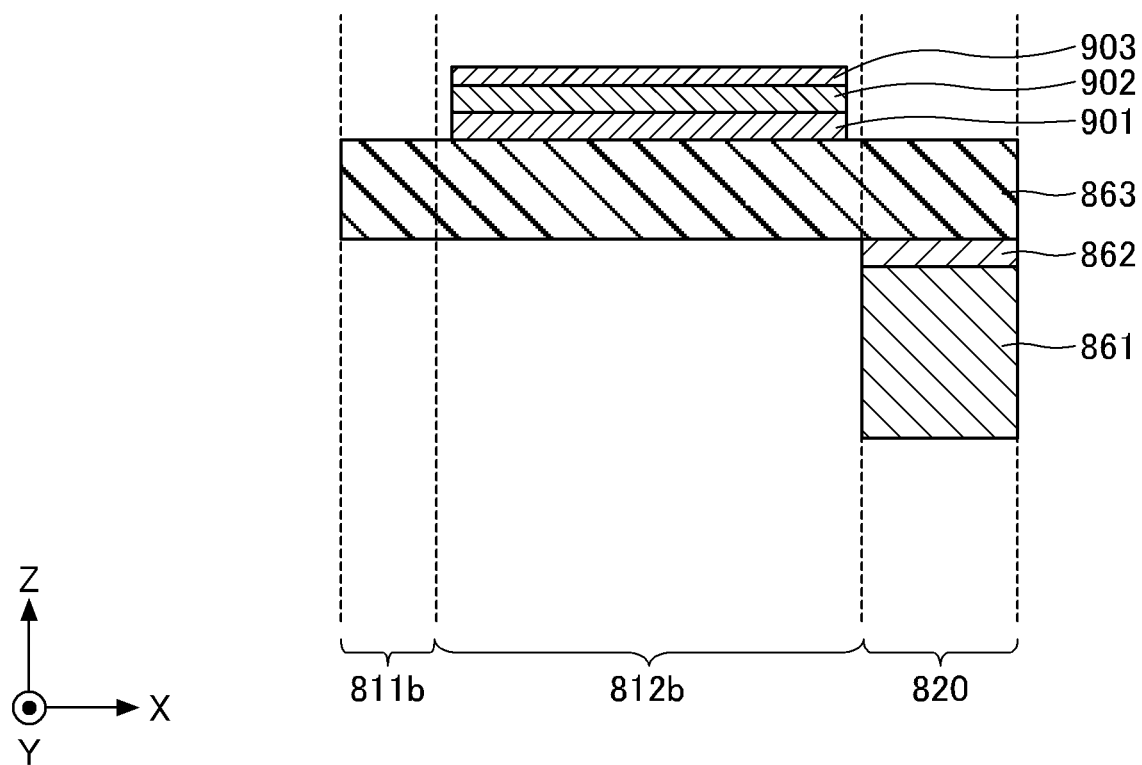
FIG. 30 is a P-P' sectional view of FIG. 29.

FIG. 30 is a P-P' sectional view of FIG. 29.

FIG. 31 is a Q-'Q' sectional view of FIG. 29.

The movable-mirror deflection element 40 is a deflection element by which light can be deflected biaxially.

As illustrated in FIG. 29, the movable-mirror deflection element 40 includes a movable mirror unit 41, and first driving units 810a and 810b, a first supporting unit 820, second driving units 830a and 830b, a second supporting unit 840, and electrode connecting parts 850.

The first driving units 810a and 810b are coupled to the movable mirror unit 41, and drives the movable mirror unit 41 around the first axis parallel to the Y-axis. The first supporting unit 820 supports the movable mirror unit 41 and the first driving units 810a and 810b.

The second driving units 830a and 830b are coupled to the first supporting unit 820, and drive the movable mirror unit 41 and the first supporting unit 820 around the second axis parallel to the X-axis. The second supporting unit 840 supports the second driving units 830a and 830b. The electrode connecting parts 850 is electrically connected to the first driving units 810a and 810b and the second driving units 830a and 830b.

The first driving units 810a and 810b include the torsion bars 811a and 811b and first piezoelectric drive circuits 812a and 812b. The second driving units 830a and 830b include second piezoelectric drive circuits 831a to 831f and 832a to 832f.

The first supporting unit 820 and the second supporting unit 840 make up the above movable-mirror supporting member 43.

For example, the movable-mirror deflection element 40 is formed by etching a sheet of silicon on insulator (SOI) substrate. More specifically, for example, the reflection plane 42 of the movable mirror unit 41, the first piezoelectric drive circuits 812a and 812b, the second piezoelectric drive circuits 831a to 831f and 832a to 832f, and multiple electrode connecting parts 850 are disposed on a molded SOI substrate. Due to this configuration, these elements are integrally molded. The above-described multiple elements may be formed after the SOI substrate is molded, or may be formed while the SOI substrate is being molded.

As illustrated in FIG. 30 and FIG. 31, the SOI substrate is a substrate where a oxidized silicon layer is formed on a first silicon layer formed of single crystal silicon (Si) and a second silicon layer formed of single crystal silicon is further formed on the oxidized silicon layer. In the following description, the first silicon layer and the second silicon layer may be referred to as a silicon supporting layer 861 and a silicon active layer 863, respectively. The silicon active layer 863 has a small thickness in the Z-axis direction compared with the thickness in the X-axis direction or the Y-axis direction, and thus the silicon active layer 863 serve as an elastic member having elasticity.

The SOI substrate does not always have to be planar, and may have, for example, curvature. As long as the substrate can be integrally processed by etching or the like and can be partially elastic, the substrate used for forming the movable-mirror deflection element 40 is not limited to a SOI substrate.

The movable mirror unit 41 includes, for example, a circular base 41a and a reflection plane 42 that is formed on the surface of the base 41a on the +Z-side. For example, the base 41a may be formed by the silicon active layer 863. The reflection plane 42 is formed by a thin metal film made of, for example, aluminum (Al), gold (Au), and silver (Ag). The movable mirror unit 41 may include a rib for strengthening the mirror unit formed on the surface of the base 41a on the −Z-side. The rib includes, for example, the silicon supporting layer 861 and the oxidized silicon layer 862, and can prevent distortion on the reflection plane 42 caused by the movement of the movable mirror unit 41.

The first driving units 810a and 810b is composed of the torsion bars 811a and 811b and first piezoelectric drive circuits 812a and 812b. Ends of the torsion bars 811a and 811b on one side are coupled to the base 41a, and the torsion bars 811a and 811b extend in the first-axis direction and support the movable mirror unit 41 in a rotatable manner. ends of each of the first piezoelectric drive circuits 812a and 812b on one side are coupled to the torsion bars 811a and 811b, respectively, and the ends of each of the first piezoelectric drive circuits 812a and 812b on the other side are coupled to the inner side of the first supporting unit 820.

As illustrated in FIG. 30, the torsion bars 811a and 811b are formed by the silicon active layer 863. The first piezoelectric drive circuits 812a and 812b include the silicon active layer 863, a lower electrode 901, a piezoelectric circuit 902, and an upper electrode 903. The lower electrode 901, the piezoelectric circuit 902, and the upper electrode 903 are formed in this order on the +Z-side surface of the silicon active layer 863 that serves as an elastic member. For example, each of the upper electrode 903 and the lower electrode 901 is made of gold (Au) or platinum (Pt). For example, the piezoelectric circuit 902 is made of lead zirconate titanate (PZT), which is a piezoelectric material.

For example, the first supporting unit 820 is composed of the silicon supporting layer 861, the oxidized silicon layer 862, and the silicon active layer 863. For example, the first supporting unit 820 is a rectangular supporting member formed to surround the movable mirror unit 41.

The second driving units 830a and 830b include, for example, a plurality of second piezoelectric drive circuits 831a to 831f and 832a to 832f that are joined so as to turn. An end of each of the second driving units 830a and 830b is coupled to an perimeter zone of the first supporting unit 820, and the other end thereof is coupled to an internal circumferential portion of the second supporting unit 840.

In the present embodiment, a connection part of the second driving unit 830a and the first supporting unit 820 and a connection part of the second driving unit 830b and the first supporting unit 820 are in point symmetry with respect to the center of the reflection plane 42. Moreover, a connection part of the second driving unit 830a and the second supporting unit 840 and a connection part of the second driving unit 830b and the second supporting unit 840 are in point symmetry with respect to the center of the reflection plane 42.

As illustrated in FIG. 31, the second driving units 830a and 830b include the silicon active layer 863, a lower electrode 901, a piezoelectric circuit 902, and an upper electrode 903. The lower electrode 901, the piezoelectric circuit 902, and the upper electrode 903 are formed in this order on the +Z-side surface of the silicon active layer 863 that serves as an elastic member.

For example, the second supporting unit 840 is composed of the silicon supporting layer 861, the oxidized silicon layer 862, and the silicon active layer 863. For example, the second supporting unit 840 is a rectangular supporting member formed to surround the movable mirror unit 41, the first driving units 810a and 810b, the first supporting unit 820, and the second driving unit 830a and 830b.

For example, the electrode connecting parts 850 are formed on the surface of the second supporting unit 840 on the +Z side. The electrode connecting parts 850 are electrically connected to the upper electrode 903 and the lower electrode 901 of each of the first piezoelectric drive circuits 812a and 812b and the second piezoelectric drive circuits 831a to 831f via electrode wiring of aluminum (Al) or the like. Each of the upper electrodes 903 and the lower electrodes 901 may be directly connected to the electrode connecting parts 850. Alternatively, in some embodiments, the upper electrodes 903 and the lower electrodes 901 may be indirectly connected to the electrode connecting parts 850 through a wire or the like that connects a pair of electrodes.

In the present embodiment, the silicon active layer 863 serves as an elastic member, and the piezoelectric circuit 902 is formed only on one surface of the silicon active layer 863 on the +Z-side. However, the piezoelectric circuit 902 may be formed on another surface of the silicon active layer 863 (for example, on the −Z-side). In other words, the piezoelectric circuit 902 may be formed on both sides of the elastic member.

The shape of the elements are not limited to the shape in the present embodiment as long as the movable mirror unit 41 can be driven around the first axis or the second axis. For example, the torsion bars 811a and 811b and the first piezoelectric drive circuits 812a and 812b may have a shape with curvature.

Furthermore, an insulating layer that is made of a oxidized silicon layer may be formed on at least one of the +Z surface of the upper electrode 903 of the first driving units 810a and 810b, the +Z surface of the first supporting unit 820, the +Z surface of the upper electrode 903 of the second driving units 830a and 830b, and the +Z surface of the second supporting unit 840.

In such a configuration, preferably, electrode wiring is arranged over the insulating layer and an opening is formed only at a connecting part between the upper electrode 903 or the lower electrode 901 and the electrode wiring. Such an opening is formed by partially removing the insulating layer or by partially not forming the insulating layer. Due to this configuration, the degree of flexibility in design of the first driving units 810a and 810b, the second driving units 830a and 830b, and the electrode wiring increases, and short circuiting due to the electrodes contacting each other can be prevented. The oxidized silicon layer may also serve as an antireflection layer.

The controlling operation to drive the first driving units and the second driving units by a controller is described below in detail.

When a positive or negative voltage is applied in a polarizing direction, the piezoelectric circuit 902 included in the first driving units 810a and 810b and the second driving units 830a and 830b is deformed (for example, expansion and contraction) proportionate to the potential of the applied voltage and exerts a so-called inverse piezoelectric effect. The first driving units 810a and 810b and the second driving units 830a and 830b make use of such an inverse piezoelectric effect to drive the movable mirror unit 41.

In the present embodiment, the angle that the XY plane forms with the reflection plane 42 when the reflection plane 42 of the movable mirror unit 41 is inclined with reference to the XY plane in the +Z-direction or the −Z-direction is referred to as a deflection angle. Note also that the +Z-direction is referred to as a positive deflection angle and the −Z-direction is referred to as a negative deflection angle.

First, the control that is performed by the controller 111 to drive the first driving units 810a and 810b is described.

In the first driving units 810a and 810b, when a driving voltage is applied in parallel with the piezoelectric circuit 902 of the first piezoelectric drive circuits 812a and 812b through the upper electrode 903 and the lower electrode 901, the piezoelectric circuit 902 is deformed. The deformation of the piezoelectric circuit 902 causes the first piezoelectric drive circuits 812a and 812b to be bent.

As a result, through the torsion caused to the two torsion bars 811a and 811b, driving force acts on the movable mirror unit 41 around the first axis, and the movable mirror unit 41 rotates around the first axis. The driving voltage to be applied to the first driving units 810a and 810b is controlled by the controller 111.

As the controller 111 applies a driving voltage with a predetermined sine waveform to the first piezoelectric drive circuits 812a and 812b of the first driving units 810a and 810b in parallel, the movable mirror unit 41 can oscillate around the first axis in the period of the sine waveform.

For example, when the frequency of the sinusoidal waveform is set to about 20 kilohertz (kHz), which is substantially equal to a resonant frequency of the torsion bars 811a and 811b, mechanical resonance occurs to the torsion bars 811a and 811b due to torsion. Accordingly, the movable mirror unit 41 can be oscillated with resonance at about 20 kHz.

The control that is performed by the controller to drive the second driving unit is described below.

Firstly, as illustrated in FIG. 29, among the multiple second piezoelectric drive circuits 831a to 831f of the second driving unit 830a, even-numbered second piezoelectric drive circuits counted from the second piezoelectric drive circuit 831a, which are closest to the movable mirror unit 41, are referred to as a first piezoelectric drive circuit group 860a. In other words, the second piezoelectric drive circuits 831b, 831d, and 831f are referred to as the first piezoelectric drive circuit group 860a. Moreover, among the multiple second piezoelectric drive circuits 832a to 832f of the second driving unit 830b, odd-numbered second piezoelectric drive circuits counted from the second piezoelectric drive circuit 832a, which are closest to the movable mirror unit 41, are referred to as the first piezoelectric drive circuit group 860a. In other words, the second piezoelectric drive circuits 832a, 832c, and 832e are referred to as the first piezoelectric drive circuit group 860a.

Further, among the multiple second piezoelectric drive circuits 831a to 831f of the second driving unit 830a, odd-numbered second piezoelectric drive circuits counted from the second piezoelectric drive circuit 831a, which are closest to the movable mirror unit 41, are referred to as a second piezoelectric drive circuit group 860b. In other words, the second piezoelectric drive circuits 831a, 831c, and 831e are referred to as the second piezoelectric drive circuit group 860b. Further, among the multiple second piezoelectric drive circuits 832a to 832f of the second driving unit 830b, even-numbered second piezoelectric drive circuits counted from the second piezoelectric drive circuit 832a, which are closest to the movable mirror unit 41, are referred to as the second piezoelectric drive circuit group 860b. In other words, the second piezoelectric drive circuits 832b, 832d, and 832f are referred to as the second piezoelectric drive circuit group 860b.

FIG. 32A, FIG. 32B, FIG. 32C, and FIG. 32D are schematic diagrams each illustrating the operation of the second driving unit, according to an embodiment of the present disclosure. In FIG. 32A, FIG. 32B, FIG. 32C, and FIG. 32D, only the second driving unit 830b is illustrated although the second driving unit 830a also exists in the actual configuration. The dotted lines indicate, for example, the movable mirror unit 41.

Figure 32A:
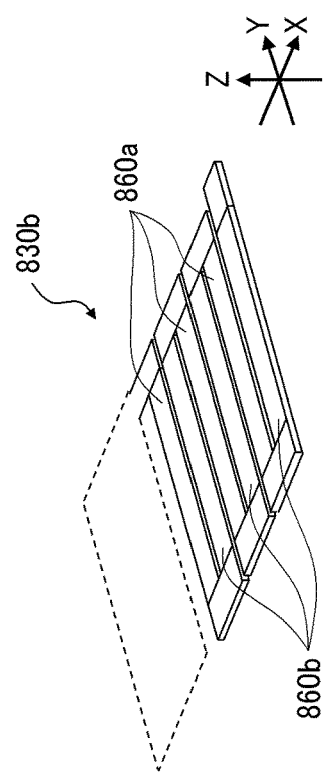
FIG. 32A, FIG. 32B, FIG. 32C, and FIG. 32D are schematic diagrams each illustrating the operation of a second driving unit, according to an embodiment of the present disclosure.

FIG. 32A illustrates a state in which no driving voltage is applied to the first piezoelectric drive circuit group 860a and the second piezoelectric drive circuit group 860b. In such cases, the deflection angle of the movable mirror unit 41 is zero.

Figure 32D:
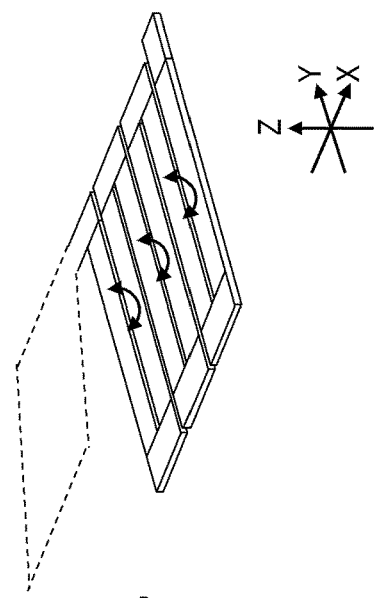
Figure 32C:
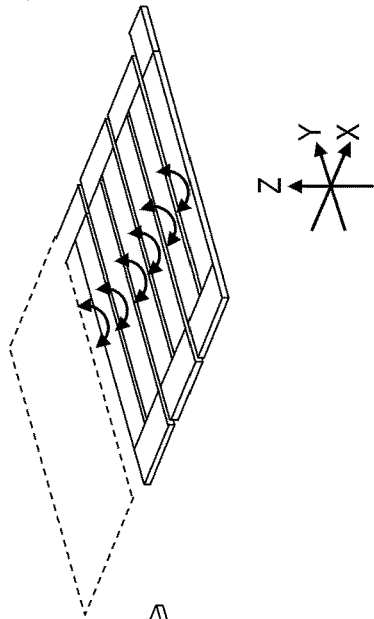
Figure 32B:
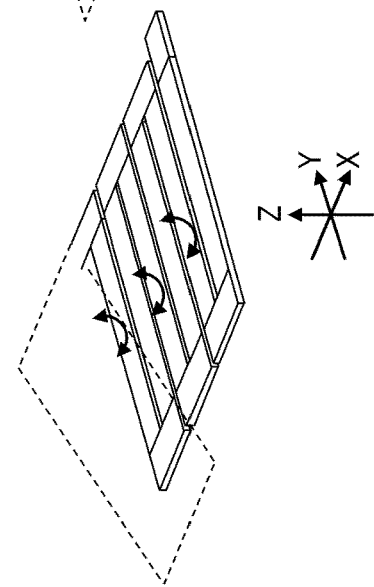

FIG. 32B illustrates a state in which driving voltage is applied parallel to the first piezoelectric drive circuit group 860a. In such a configuration, the first piezoelectric drive circuit group 860a is elastically deformed in the same direction, and the movable mirror unit 41 driven to rotate around the second axis in the −Z-direction.

FIG. 32D illustrates a state in which driving voltage is applied parallel to the second piezoelectric drive circuit group 860b. In such a case, the second piezoelectric drive circuit group 860b is elastically deformed in the same direction, and the movable mirror unit 41 driven to rotate around the second axis in the +Z-direction.

As described above, the first piezoelectric drive circuit group 860a or the second piezoelectric drive circuit group 860b is elastically deformed at the same time. Accordingly, the amounts of movement due to the elastic deformation can be accumulated, and the deflection angle of the movable mirror unit 41 around the second axis can be increased. As illustrated in FIG. 29, the second driving units 830a and 830b are coupled to each other in point symmetry with reference to the center of the first supporting unit 820. Due to this configuration, when driving voltage is applied to the first piezoelectric drive circuit group 860a, driving force in the +Z-direction is caused to a connecting part between the first supporting unit 820 and the second driving unit 830a. On the other hand, driving force in the −Z-direction is caused to a connecting part between the first supporting unit 820 and the second driving unit 830b. As a result, the driving force is accumulated, and the deflection angle of the movable mirror unit 41 around the second axis increases.

FIG. 32C illustrates a state in which how much the movable mirror unit 41 is driven by the first piezoelectric drive circuit group 860a to which voltage has been applied is in line with how much the movable mirror unit 41 is driven by the second piezoelectric drive circuit group 860b to which voltage has been applied.

In such cases, the deflection angle of the movable mirror unit 41 is zero.

As the driving voltage is applied to the second driving units 830a and 830b in a manner that the states illustrated in FIG. 32B, FIG. 32C, FIG. and FIG. 32D are repeated in a continuous manner, the movable mirror unit 41 can oscillate around the second axis. The driving voltage to be applied to the second driving units 830a and 830b is controlled by the controller 111.

The first driving voltage V1 that is applied to the first piezoelectric drive circuit group 860a and the second driving voltage V2 that is applied to the second piezoelectric drive circuit group 860b are described below.

Figure 33A:
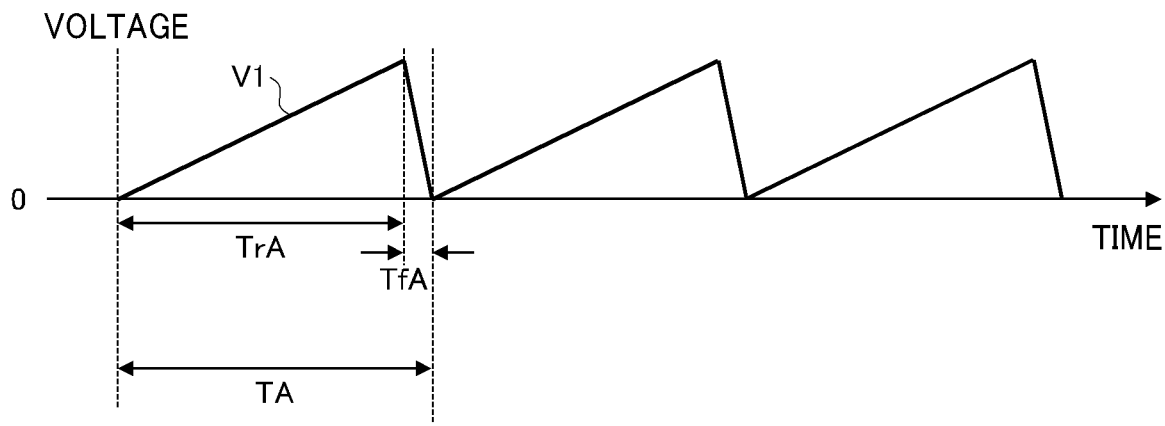
FIG. 33A, FIG. 33B, and FIG. 33C are graphs illustrating first driving voltage and second driving voltage, according to an embodiment of the present disclosure.

FIG. 33A is a diagram illustrating the waveform of the first driving voltage V1, according to an embodiment of the present disclosure.

Figure 33B:
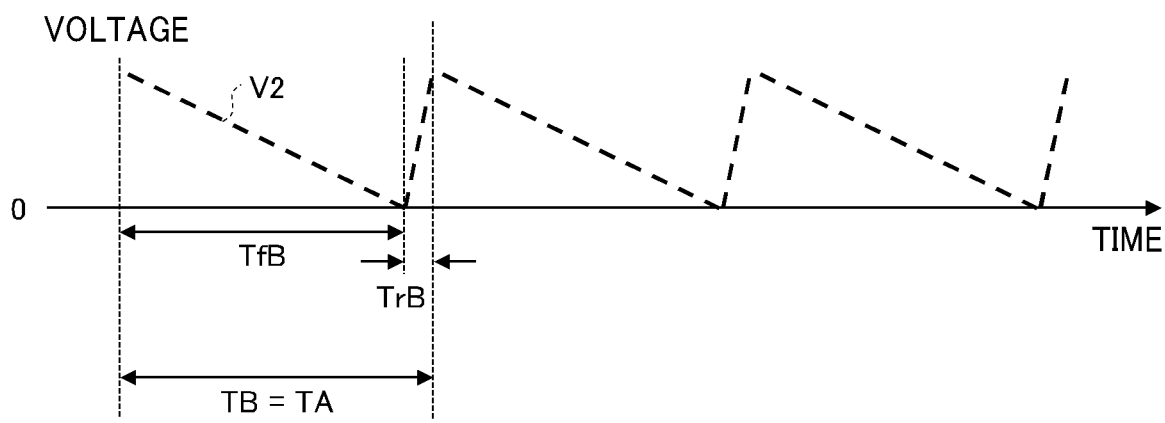

FIG. 33B is a diagram illustrating the waveform of the second driving voltage V2, according to an embodiment of the present disclosure.

Figure 33C:
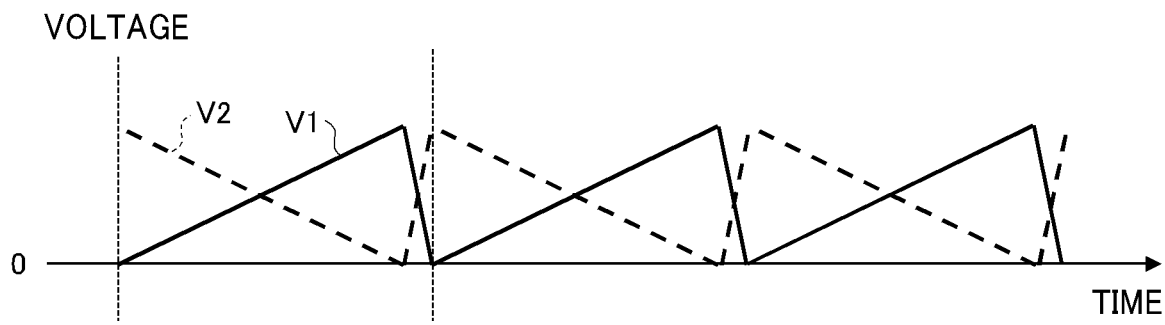

FIG. 33C is a diagram illustrating the waveform of the first driving voltage V1 and the waveform of the second driving voltage V2 that are superimposed on top of one another, according to an embodiment of the present disclosure.

As illustrated in FIG. 33A, for example, the waveform of the first driving voltage V1 is in a sawtooth waveform, and the frequency thereof is, for example, 60 hertz (Hz). For example, the waveform of the first driving voltage V1 satisfies TrA:TfA=9:1, where TrA denotes the length of time of a rise time and TfA denotes the length of time of a fall time.

As illustrated in FIG. 33B, for example, the waveform of the second driving voltage V2 is in a sawtooth waveform, and the frequency thereof is, for example, 60 Hz. For example, the waveform of the second driving voltage V2 satisfies TfB:TrB=9:1, where TrB denotes the length of time of a rise time and TfB denotes the length of time of a fall time.

As illustrated in FIG. 23C, for example, a cycle TA of the waveform of the first driving voltage V1 and a period TB of the waveform of the second driving voltage V2 are set to be equal to each other.

For example, the sawtooth waveform of the first driving voltage V1 and the second driving voltage V2 is generated by superimposing multiple sine waves on top of one another. Although the sawtooth waveform is used as the first driving voltage V1 and the second driving voltage V2 in the present embodiment, the waveform is not limited to the sawtooth waveform and may be modified in accordance with the device characteristics of the light deflector 113. For example, the waveform may be modified such that the crest of the sawtooth waveform is rounded, or the waveform may be modified such that the linear region of the sawtooth waveform is curved.

Figure 34:
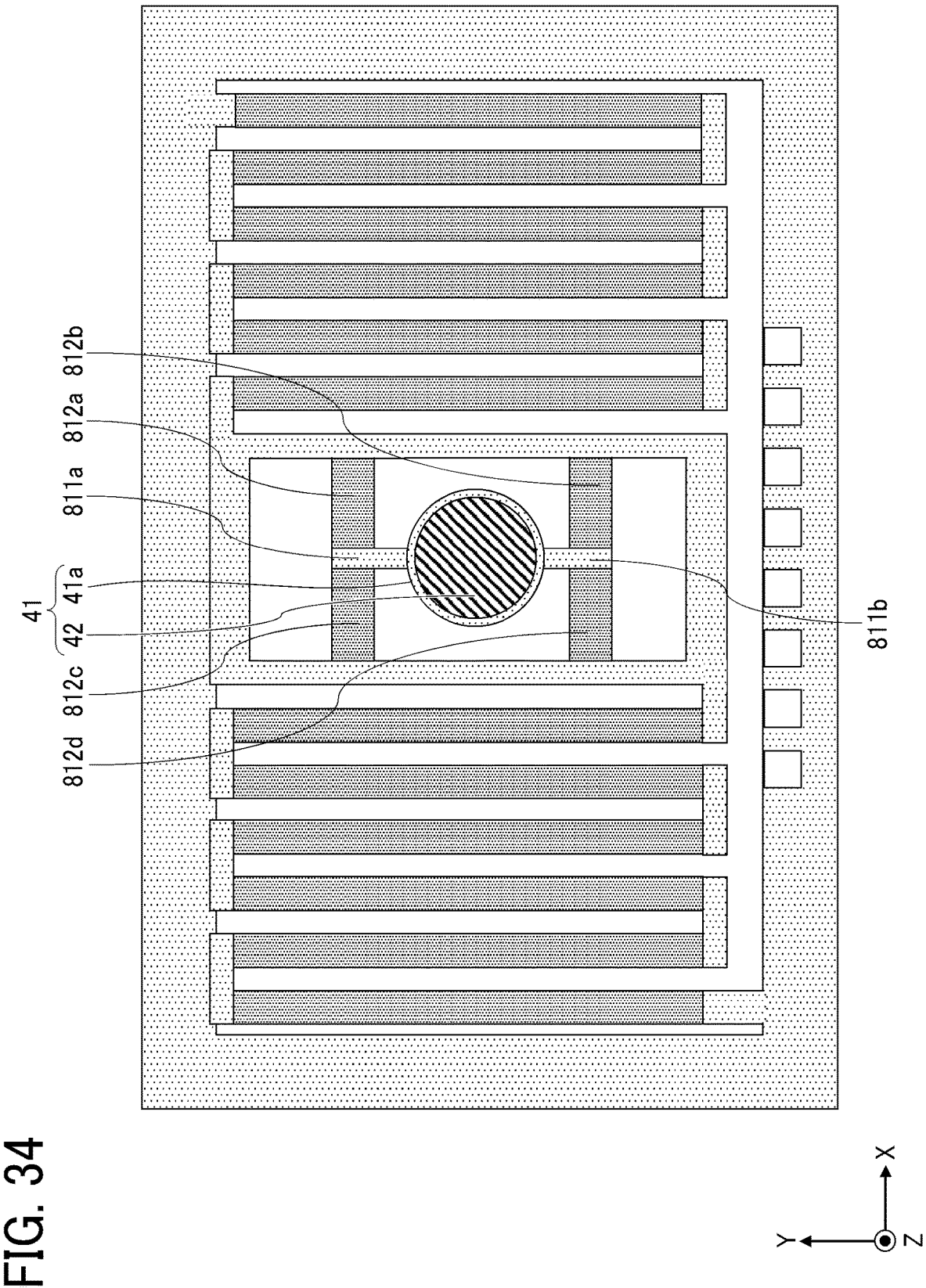
FIG. 34 is a plan view of a movable-mirror deflection element of double-supported type according to an embodiment of the present disclosure.

In FIG. 29, the movable-mirror deflection element 40 is illustrated as a driving element in a cantilevered state, which is provided with the first piezoelectric drive circuits 812a and 812b that extend in the +X-direction from the torsion bars 811a and 811b, respectively. However, no limitation is intended thereby. For example, as illustrated in FIG. 34, a driving element of double-supported type provided with first piezoelectric drive circuits 812c and 812d that extend in the −X-direction may be used in addition to the first piezoelectric drive circuits 812a and 812b that extend in the +X-direction from the torsion bars 811a and 811b, respectively.

Figure 35:
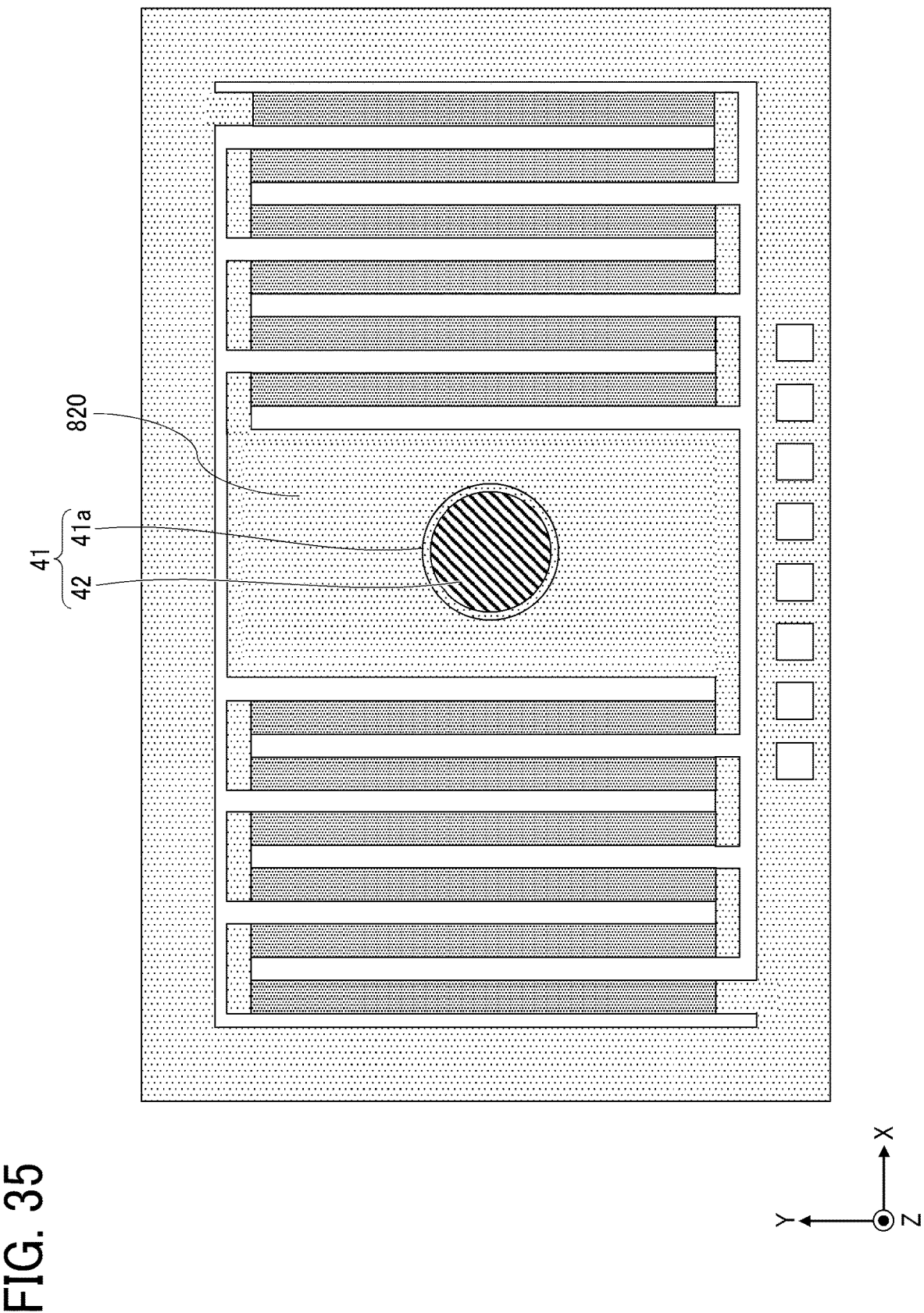
FIG. 35 is a plan view of a movable-mirror deflection element that is driven only on a single axis, according to an embodiment of the present disclosure.

Further, when the movable mirror unit 41 is driven only on a single axis, as illustrated in FIG. 35, the movable mirror unit 41 may be disposed on the first supporting unit 820 in a direct manner without arranging the first driving units 810a and 810b.

The present disclosure has been described above on the basis of the embodiments, but the present disclosure is not limited to the above embodiments. The embodiments may be modified without departing from the spirit of the present disclosure and may be determined appropriately in accordance with applications.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. A light deflector comprising:
a transparent member through which incident light passes;
a movable mirror unit configured to reflect the incident light that has passed through the transparent member; and
a light-beam adjuster disposed on the transparent member, the light-beam adjuster having a light-beam adjusting plane to adjust an optical path of light reflected by the transparent member,
wherein the light-beam adjuster further comprises a plurality of planes that includes the light-beam adjusting plane, and wherein the light-beam adjuster adjusts, by causing the plurality of planes to transmit or reflect part of incident light incident on the light-beam adjuster, the optical path of light reflected by the transparent member so that the optical path of light reflected by the transparent member does not overlap with an optical path along which the incident light is reflected by the movable mirror unit and emitted.

2. The light deflector according to claim 1, wherein the light-beam adjusting plane is positioned between an optical path of the incident light incident on the movable mirror unit and an optical path of the incident light reflected by the movable mirror unit.

3. The light deflector according to claim 1, wherein the transparent member and the light-beam adjuster are made of glass.

4. The light deflector according to claim 1,
wherein the transparent member is made of glass, and
wherein the light-beam adjuster is made of resin.

5. The light deflector according to claim 1, wherein the transparent member and the light-beam adjuster are made of resin.

6. The light deflector according to claim 1,
wherein the movable mirror unit has an incident plane on which the incident light is incident, and
wherein the light-beam adjuster has a triangular shape in cross section in the incident plane of the movable mirror unit.

7. The light deflector according to claim 1, wherein the reflection light is totally reflected by the light-beam adjusting plane.

8. The light deflector according to claim 1,
wherein the light-beam adjusting plane comprises a concave and convex part that scatters the reflection light, and
wherein the concave and convex part includes an area on which the reflection light is incident.

9. The light deflector according to claim 1,
wherein the light-beam adjuster comprises a light-shielding layer disposed on the light-beam adjusting plane, and
wherein the light-shielding layer includes an area on which the reflection light is incident and shields the reflection light.

10. The light deflector according to claim 1,
wherein the light-beam adjusting plane is same as a plane on which the incident light is incident, and
wherein the light-beam adjusting plane comprises a concave and convex part that causes the reflection light to be scattered, and
wherein the concave and convex part includes an area on which the reflection light is incident.

11. The light deflector according to claim 1,
wherein the light-beam adjusting plane is same as a plane on which the incident light is incident,
wherein the light-beam adjuster comprises a light-shielding layer disposed on the light-beam adjusting plane, and
wherein the light-shielding layer shields the reflection light and includes an area on which the reflection light is incident.

12. The light deflector according to claim 1, wherein the light-beam adjuster has a rectangular shape in cross section along an incident plane on which the incident light is incident, facing a reflection plane of the movable mirror unit.

13. The light deflector according to claim 12,
wherein the reflection light is totally reflected by the light-beam adjusting plane of the light-beam adjuster, and
wherein the light-beam adjusting plane comprises a concave and convex part that causes the reflection light to be scattered, and
wherein the concave and convex part is disposed on a plane on which the reflection light totally reflected by the light-beam adjusting plane is incident.

14. The light deflector according to claim 12,
wherein the reflection light is totally reflected by the light-beam adjusting plane of the light-beam adjuster,
wherein the light-beam adjuster comprises a light-shielding layer disposed on the light-beam adjusting plane, and
wherein the light-shielding layer shields the reflection light and is formed on a plane on which the reflection light totally reflected by the light-beam adjusting plane is incident.

15. An object recognition device comprising
the light deflector according to claim 1,
wherein the light deflector performs optical scanning and detects an object existing in a target direction by performing the optical scanning.

16. A laser headlamp device comprising
the light deflector according to claim 1,
wherein a laser beam scanned by the light deflector is made incident on a fluorescent material to generate white illumination light.

17. An optical writing device comprising
the light deflector according to claim 1,
wherein optical writing is performed on a photoreceptor by optical scanning performed by the light deflector.

18. The light deflector according to claim 1, further comprising:
a housing coupled to the transparent member, the housing accommodating the movable mirror unit.

19. An image projector comprising
a light deflector including:
a transparent member through which incident light passes;
a movable mirror unit configured to reflect the incident light that has passed through the transparent member; and
a light-beam adjuster disposed on the transparent member, the light-beam adjuster having a light-beam adjusting plane to adjust an optical path of light reflected by the transparent member,
wherein the light deflector performs optical scanning and projects an image by performing the optical scanning,
wherein the light-beam adjuster further comprises a plurality of planes that includes the light-beam adjusting plane, and
wherein the light-beam adjuster adjusts, by causing the plurality of planes to transmit or reflect part of incident light incident on the light-beam adjuster, the optical path of light reflected by the transparent member so that the optical path of light reflected by the transparent member does not overlap with an optical path along which the incident light is reflected by the movable mirror unit and emitted.

20. A light deflector comprising:
a light-beam adjuster;
a transparent member through which incident light passes, wherein the transparent member includes an incident plane on which the incident light that has passed through the light-beam adjuster is incident;
a movable mirror unit configured to reflect the incident light that has passed through the transparent member, wherein the incident light is projected to a projection plane; and
wherein the light-beam adjuster is disposed on the transparent member, the light-beam adjuster having a light-beam adjusting plane to adjust an optical path of light reflected by the transparent member,
wherein the light-beam adjuster further comprises:
a first plane on which the incident light is incident; and
a second plane bonded on the incident plane of the transparent member,
wherein the light-beam adjusting plane is disposed between the first plane and the projection plane in a sub-scanning direction of the incident light, and
wherein the light-beam adjusting plane causes reflection light from the transparent member to be totally reflected to a direction opposite to the projection plane.

* * * * *